US007107142B2

(12) United States Patent
Harada et al.

(10) Patent No.: US 7,107,142 B2
(45) Date of Patent: Sep. 12, 2006

(54) AUTOMATIC COMPLIANCE DEVICE, AUTOMATIC COMPLIANCE METHOD, AUTOMOBILE, AND STORAGE MEDIUM

(75) Inventors: Yasuo Harada, Susono (JP); Takao Fukuma, Susono (JP); Teruhiko Miyake, Susono (JP); Yusuke Nozaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 116 days.

(21) Appl. No.: 10/631,814

(22) Filed: Aug. 1, 2003

(65) Prior Publication Data

US 2004/0117105 A1 Jun. 17, 2004

(30) Foreign Application Priority Data

Aug. 1, 2002 (JP) ............................ 2002-225183
Jun. 2, 2003 (JP) ............................ 2003-156582

(51) Int. Cl.
*G01M 15/00* (2006.01)

(52) U.S. Cl. ........................................ 701/114

(58) Field of Classification Search .................... 123/4; 701/114, 104–109

See application file for complete search history.

(56) References Cited

U.S. PATENT DOCUMENTS 4,827,718 A * 5/1989 Terui ........................... 60/312
5,941,918 A * 8/1999 Blosser ........................ 701/29
5,978,727 A * 11/1999 Jones et al. ................. 701/101
6,098,012 A * 8/2000 Stander et al. .............. 701/104
6,151,547 A * 11/2000 Kumar et al. ............... 701/101

FOREIGN PATENT DOCUMENTS

| | | |
|---|---|---|
| JP | U 5-36015 | 5/1993 |
| JP | A-9-325949 | 12/1997 |
| JP | 1 010 882 A2 | 6/2000 |
| JP | A 2002-138889 | 5/2002 |

OTHER PUBLICATIONS

JPO and NCIPI computer generated translation of JP-A-9-325949 Dec. 16, 1997.*

* cited by examiner

*Primary Examiner*—Henry C. Yuen
*Assistant Examiner*—Arnold Castro
(74) *Attorney, Agent, or Firm*—Oliff & Berridge, PLC

(57) ABSTRACT

Parameters for control of engine operation are operated for each operating state for establishment of compliance, whereby the output values are made compliance targets. This compliance operation is performed by first determining the adjustment sequences and adjustment directions for a plurality of parameters for reducing the output values exceeding the compliance targets and then sequentially operating these parameters in accordance with the determined adjustment sequence and in the determined adjustment direction.

44 Claims, 27 Drawing Sheets

Fig.12

| NO. | CONCENTRATION OF SMOKE | NOx | HC | COMBUSTION NOISE | MAIN INJECTION TIMING | PILOT INJECTION INTERVAL | PILOT INJECTION AMOUNT | COMMON RAIL PRESSURE | EGR CONTROL VALVE |
|---|---|---|---|---|---|---|---|---|---|
| 1 | 1 | | | | [2] DELAY ADVANCE | [4] LARGE | [5] DECREASE | [3] INCREASE | [1] CLOSE |
| 2 | | 1 | | | [2] DELAY | [4] LARGE/ SMALL | [5] DECREASE | [3] DECREASE | [1] OPEN |
| 3 | | | 1 | | [2] BTDC: DELAY ATDC: ADVANCE | [4] SMALL | [5] DECREASE/ INCREASE | [2] INCREASE/ DECREASE | [3] CLOSE/ OPEN |
| 4 | | | | 1 | [2] DELAY ADVANCE | [3] SMALL/ LARGE | [4] INCREASE/ DECREASE | [1] DECREASE | [5] OPEN |

Fig. 13A

| NO. | CONCENTRATION OF SMOKE | NOx | HC | COMBUSTION NOISE | MAIN INJECTION TIMING | PILOT INJECTION INTERVAL | PILOT INJECTION AMOUNT | COMMON RAIL PRESSURE | EGR CONTROL VALVE |
|---|---|---|---|---|---|---|---|---|---|
| 1 | DETERIORATION SEQUENCE 1 | 2 | – | – | [1]<br>DELAY<br>ADVANCE | [2]<br>LARGE/<br>SMALL | [3]<br>DECREASE | [4]<br>INCREASE | |
| 2 | 2 | 1 | – | – | [1]<br>DELAY<br>ADVANCE | [2]<br>LARGE/<br>SMALL | [3]<br>DECREASE | [4]<br>DECREASE | |
| 3 | 1 | – | 2 | – | [1]<br>BTDC:<br>DELAY ADVANCE<br>ATDC:<br>ADVANCE DELAY | [2]<br>LARGE/<br>SMALL | [5]<br>DECREASE/<br>INCREASE | [3]<br>INCREASE | [2]<br>CLOSE |
| 4 | 2 | – | 1 | – | [1]<br>BTDC:<br>DELAY ADVANCE<br>ATDC:<br>ADVANCE DELAY | [2]<br>LARGE/<br>SMALL | [5]<br>DECREASE/<br>INCREASE | [3]<br>INCREASE | [2]<br>CLOSE |

Fig. 13B

| NO. | CONCENTRATION OF SMOKE | NOx | HC | COMBUSTION NOISE | MAIN INJECTION TIMING | PILOT INJECTION INTERVAL | PILOT INJECTION AMOUNT | COMMON RAIL PRESSURE | EGR CONTROL VALVE |
|---|---|---|---|---|---|---|---|---|---|
| 5 | 1 | – | – | 2 | [1] DELAY ADVANCE | [2] LARGE/ SMALL | [3] DECREASE/ INCREASE | [5] INCREASE | [4] CLOSE |
| 6 | 2 | – | – | 1 | [1] DELAY ADVANCE | [2] LARGE/ SMALL | [3] INCREASE/ DECREASE | [5] DECREASE | [4] CLOSE |
| 7 | – | 1 | 2 | – | [1] BTDC: DELAY ATDC: ADVANCE DELAY | [2] LARGE/ SMALL | [3] DECREASE/ INCREASE | [4] DECREASE | [5] OPEN |
| 8 | – | 2 | 1 | – | [1] BTDC: DELAY ATDC: ADVANCE DELAY | [2] LARGE/ SMALL | [3] DECREASE/ INCREASE | [4] DECREASE | [5] OPEN |

Fig. 13C

| NO. | CONCENTRATION OF SMOKE | NOx | HC | COMBUSTION NOISE | MAIN INJECTION TIMING | PILOT INJECTION INTERVAL | PILOT INJECTION AMOUNT | COMMON RAIL PRESSURE | EGR CONTROL VALVE |
|---|---|---|---|---|---|---|---|---|---|
| 9 | - | 1 | - | 2 | [1] BTDC: DELAY ATDC: ADVANCE DELAY | [2] LARGE/ SMALL | [5] INCREASE/ DECREASE | [3] DECREASE | [2] OPEN |
| 10 | - | 2 | - | 1 | [1] BTDC: DELAY ATDC: ADVANCE DELAY | [2] LARGE/ SMALL | [5] INCREASE/ DECREASE | [3] DECREASE | [2] OPEN |
| 11 | - | - | 1 | 2 | [1] BTDC: DELAY ATDC: ADVANCE DELAY | [2] LARGE/ SMALL | [5] INCREASE/ DECREASE | [4] DECREASE | |
| 12 | - | - | 2 | 1 | [1] BTDC: DELAY ATDC: ADVANCE DELAY | [2] LARGE/ SMALL | [5] INCREASE/ DECREASE | [4] DECREASE | |

Fig.14

| FUEL INJECTION AMOUNT \ SPEED | $N_1$ | $N_2$ | $N_3$ | $N_4$ | $N_5$ | $N_6$ | $N_7$ |
|---|---|---|---|---|---|---|---|
| $Q_1$ | × | × | × | × | × | × | × |
| $Q_2$ | × | × | × | × | × | × | × |
| $Q_3$ | ○ | ○ | ○ | ○ | ○ | ○ | ○ |
| $Q_4$ | ○ | ○ | ○ | ○ | ○ | ○ | ○ |
| $Q_5$ | ○ | ○ | ○ | ○ | ○ | ○ | ○ |
| $Q_6$ | ○ | ○ | ○ | ○ | ○ | ○ | ○ |

Fig.16

| NO. | CONCENTRATION OF SMOKE | NOx | PILOT INJECTION INTERVAL | PILOT INJECTION AMOUNT | COMMON RAIL PRESSURE | EGR CONTROL VALVE |
|---|---|---|---|---|---|---|
| 1 | 1 | | [4] INCREASE/ DECREASE | [3] INCREASE/ DECREASE | [2] INCREASE | [1] CLOSE |
| 2 | | 1 | [4] INCREASE/ DECREASE | [3] INCREASE/ DECREASE | [2] DECREASE | [2] OPEN |

Fig.17

| ADJUSTMENT SEQUENCE | 1 | | 2 | | 3 | |
|---|---|---|---|---|---|---|
| | COVERAGE | DIRECTION | COVERAGE | DIRECTION | COVERAGE | DIRECTION |
| CONCENTRATION OF SMOKE | EGR CONTROL VALVE | CLOSE | COMMON RAIL PRESSURE | INCREASE | PILOT INJECTION AMOUNT | INCREASE |
| NOx | EGR CONTROL VALVE | OPEN | COMMON RAIL PRESSURE | DECREASE | PILOT INJECTION AMOUNT | INCREASE |

| ADJUSTMENT SEQUENCE | 4 | | 5 | | 6 | |
|---|---|---|---|---|---|---|
| | COVERAGE | DIRECTION | COVERAGE | DIRECTION | COVERAGE | DIRECTION |
| CONCENTRATION OF SMOKE | PILOT INJECTION AMOUNT | DECREASE | PILOT INJECTION INTERVAL | INCREASE | PILOT INJECTION INTERVAL | DECREASE |
| NOx | PILOT INJECTION AMOUNT | DECREASE | PILOT INJECTION INTERVAL | INCREASE | PILOT INJECTION INTERVAL | DECREASE |

Fig.19

| ADJUSTMENT SEQUENCE | 1 | | 2 | |
|---|---|---|---|---|
| | COVERAGE | DIRECTION | COVERAGE | DIRECTION |
| SMOKE NOx | EGR CONTROL VALVE | CLOSE | EGR CONTROL VALVE | OPEN |

| ADJUSTMENT SEQUENCE | 3 | | 4 | |
|---|---|---|---|---|
| | COVERAGE | DIRECTION | COVERAGE | DIRECTION |
| SMOKE NOx | COMMON RAIL PRESSURE | INCREASE | COMMON RAIL PRESSURE | DECREASE |

Fig.20

| ADJUSTMENT SEQUENCE | 1 | | 2 | |
|---|---|---|---|---|
| | COVERAGE | DIRECTION | COVERAGE | DIRECTION |
| SMOKE NOx | PILOT INJECTION AMOUNT | INCREASE | PILOT INJECTION AMOUNT | DECREASE |

| ADJUSTMENT SEQUENCE | 3 | | 4 | |
|---|---|---|---|---|
| | COVERAGE | DIRECTION | COVERAGE | DIRECTION |
| SMOKE NOx | PILOT INJECTION INTERVAL | INCREASE | PILOT INJECTION INTERVAL | DECREASE |

AUTOMATIC COMPLIANCE DEVICE, AUTOMATIC COMPLIANCE METHOD, AUTOMOBILE, AND STORAGE MEDIUM

BACKGROUND OF THE INVENTION

1. Field of the Invention

The present invention relates to an automatic compliance device, automatic compliance method, automobile, and storage medium.

2. Description of the Related Art

When developing new internal combustion engines not seen in the past, work is performed to search for values of parameters for control of engine operation enabling the optimal engine output values to be obtained, that is, compliance work is performed. In this compliance work, the values of parameters such as the fuel injection amounts and fuel injection timings are changed little by little based on experience and thereby a long time is spent to find the compliance values of parameters enabling one to obtain the optimal engine output values, for example, the optimal exhaust emission amounts. The same applies to development of new vehicles.

However, even if searching for compliance values of parameters based on experience in this way, if the number of parameters becomes greater, finding the optimum compliance values of the parameters becomes difficult. Further, since finding the optimal values of the parameters takes a long time, there is the problem that not only does the development also take a long time, but also a tremendous amount of labor is required.

Therefore, an automatic compliance device designed to automatically perform the compliance work for parameters has already been proposed (see Japanese Unexamined Patent Publication (Kokai) No. 2002-138889). In this automatic compliance device, one parameter giving the greatest effect upon one output value is set in advance, that is, combinations of output values and parameters are set in advance, and the parameters for finding the parameter compliance values of the parameters are simultaneously feedback controlled so that the output values combined with the parameters become the corresponding target output values.

However, in practice, when the operating state of the engine changes, the parameters having the greatest effects on the output values change accordingly and therefore it is difficult to set in advance one parameter having the greatest effect on an output value as explained above. Further, in practice, when one parameter changes, some output values will become closer to the target output values, but other output values will become further from the target output values. Therefore, even if simultaneously feedback controlling all parameters, it is difficult to find the compliance values of parameters whereby all output values will approach the target output values.

SUMMARY OF THE INVENTION

An object of the present invention is to provide a practical automatic compliance device able to automatically reliably establish compliance of parameters, an automatic compliance method, an automobile, and a storage medium storing a program for an automatic compliance operation.

To achieve this object, according to a first aspect of the invention, there is provided an automatic compliance device comprising: compliant operating state determining means for determining a plurality of operating states for establishing compliance; parameter initial value determining means for determining initial values of a plurality of parameters for control of the engine operation for each operating state for establishment of compliance; compliance target value determining means for determining compliance target values for the plurality of output values; and parameter complying means for determining adjustment sequences and adjustment directions of a plurality of parameters for reducing output values exceeding compliance target values and sequentially adjusting these parameters in accordance with the determined adjustment sequences in the determined adjustment directions.

According to a second aspect of the invention, there is provided an automatic compliance method comprising the steps of: determining a plurality of operating states for establishing compliance; determining initial values of a plurality of parameters for control of engine operation for individual operating states for establishing compliance; determining compliance target values for the plurality of output values; determining adjustment sequences and adjustment directions of a plurality of parameters for reducing output values exceeding compliance target values; and sequentially adjusting these parameters in accordance with the determined adjustment sequences in the determined adjustment directions.

According to a third aspect of the invention, there is provided an automobile enabling onboard establishment of compliance provided with an automatic compliance device provided with compliant operating state determining means for determining a plurality of operating states for establishing compliance, parameter initial value determining means for determining initial values of a plurality of parameters for control of the engine operation for each operating state for establishment of compliance, compliance target value determining means for determining compliance target values for the plurality of output values, and parameter complying means for determining adjustment sequences and adjustment directions of a plurality of parameters for reducing output values exceeding compliance target values and sequentially adjusting these parameters in accordance with the determined adjustment sequences in the determined adjustment directions.

According to a fourth aspect of the invention, there is provided a storage medium for storing in a computer a program for realizing an automatic compliance device.

BRIEF DESCRIPTION OF THE DRAWINGS

These and other objects and features of the present invention will become clearer from the following description of the preferred embodiments given with reference to the attached drawings, wherein:

FIG. 12 is a view of adjustment sequences and adjustment directions of parameters;

FIGS. 13A, 13B and 13C are views of adjustment sequences and adjustment directions of parameters;

FIG. 14 is a view of operating regions satisfying all compliance targets and operating regions not satisfying them;

FIG. 16 is a view of adjustment sequences and adjustment directions of parameters;

FIG. 17 is a view of adjustment sequences and adjustment directions of parameters;

FIG. 19 is a view of adjustment sequences and adjustment directions of parameters;

FIG. 20 is a view of adjustment sequences and adjustment directions of parameters;

DESCRIPTION OF THE PREFERRED EMBODIMENTS

Figure 1:
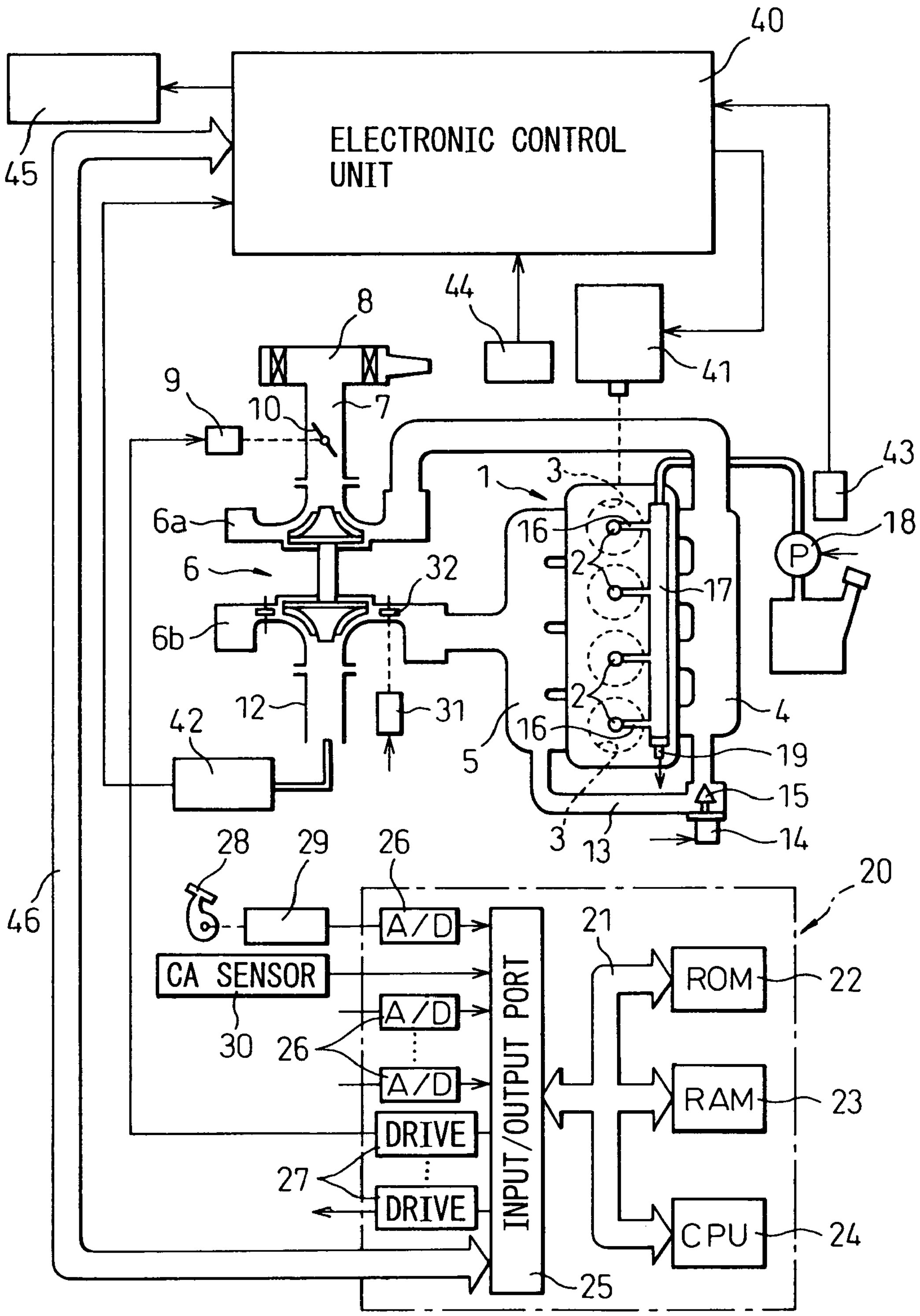
FIG. 1 is an overview of an automobile compliance device.

FIG. 1 shows an automatic compliance device for automatically establishing compliance for parameters for control of the operation of a compression ignition type internal combustion engine. Note that in this case the internal combustion engine may also be a spark ignition type internal combustion engine.

Referring to FIG. 1, 1 indicates an engine body, 2 an electrically controlled fuel injector for injecting fuel toward the combustion chamber of a cylinder 3, 4 an intake manifold, 5 an exhaust manifold, and 6 an exhaust turbocharger. The intake manifold 4 is connected to the outlet of an intake compressor 6*a* of an exhaust turbocharger 6, while the inlet of the intake compressor 6*a* is connected through an intake duct 7 to an air cleaner 8. The intake duct 7 has arranged inside it an intake throttle valve 10 driven by an actuator 9 such as a step motor.

On the other hand, the exhaust manifold 5 is connected to an inlet of an exhaust turbine 6*b* of the exhaust turbocharger 6, while the outlet of the exhaust turbine 6*b* is connected to an exhaust pipe 12. The intake manifold 4 and the exhaust manifold 5 are connected to each other through an exhaust gas recirculation (EGR) passage 13. The EGR passage 13 has arranged inside it an EGR control valve 15 driven by an actuator 14 such as a step motor.

On the other hand, the fuel injectors 2 are connected to a fuel reservoir, a so-called common rail 17, through fuel feed pipes 16. Fuel is fed into the common rail 17 from an electrically controlled variable discharge fuel pump 18. The fuel fed into the common rail 17 is fed to the fuel injectors 2 through the fuel feed pipes 16. The common rail 17 has a fuel pressure sensor 19 attached to it for detecting the fuel pressure in the common rail 17. The discharge of the fuel pump 18 is controlled based on the output signal of the fuel pressure sensor 19 so that the fuel pressure in the common rail 17 becomes a target fuel pressure.

An electronic control unit 20 for controlling the operation of the internal combustion engine is comprised of a digital computer provided with a read only memory (ROM) 22, random access memory (RAM) 23, microprocessor (CPU) 24, and input/output port 25 connected to each other through a bidirectional bus 21. The output signals of the various sensors such as the fuel pressure sensor 19 are input through corresponding AD converters 26 to the input/output port 25. Further, an accelerator pedal 28 has connected to it a load sensor 29 generating an output voltage proportional to the amount of depression of the accelerator pedal 28. The output voltage of the load sensor 29 is input to the input/output port 25 through the corresponding AD converter 26. A crank angle sensor 30 generates an output pulse each time the engine turns by for example 15 degrees. The output pulse is input to the input/output port 25.

On the other hand, the input/output port 25 is connected to the fuel injector 2, throttle valve actuator 9, EGR control valve actuator 14, and fuel pump 18 through corresponding drive circuits 27. Further, a diffuser of the exhaust turbine 6*b* is provided with a variable nozzle mechanism comprised of a large number of vane nozzles 32 driven by an actuator 31. The input/output port 25 is connected to the actuator 31 through a corresponding drive circuit 27.

As shown in FIG. 1, an electronic control unit 40 is provided for the compliance operation as shown in FIG. 1. The output shaft of the internal combustion engine is connected to a dynamometer 41. The dynamometer 41 is connected to the electronic control unit 40 and is controlled by the electronic control unit 40. Further, an analyzer 42 for exhaust components such as the amount of NOx in the exhaust gas, the concentration of smoke, the amount of particulate, the amount of hydrocarbons, the amount of CO, etc., a fuel consumption meter 43 of fuel consumed by the internal combustion engine, and a noise meter 44 for detecting the combustion noise generated by the internal combustion engine are provided. The output signals of these exhaust component analyzer 42, fuel consumption meter 43, and noise meter 44 are input to the electronic control unit 40. Further, the air conditioner or temperature controller 45 are controlled by the output signal of the electronic control unit 40. Further, the input/output ports 25 of the electronic control unit 20 and electronic control unit 40 are connected through a bidirectional bus 46.

Next, the automatic compliance method according to the present invention will be explained along with the automatic compliance routine shown in FIG. 2.

Figure 2:
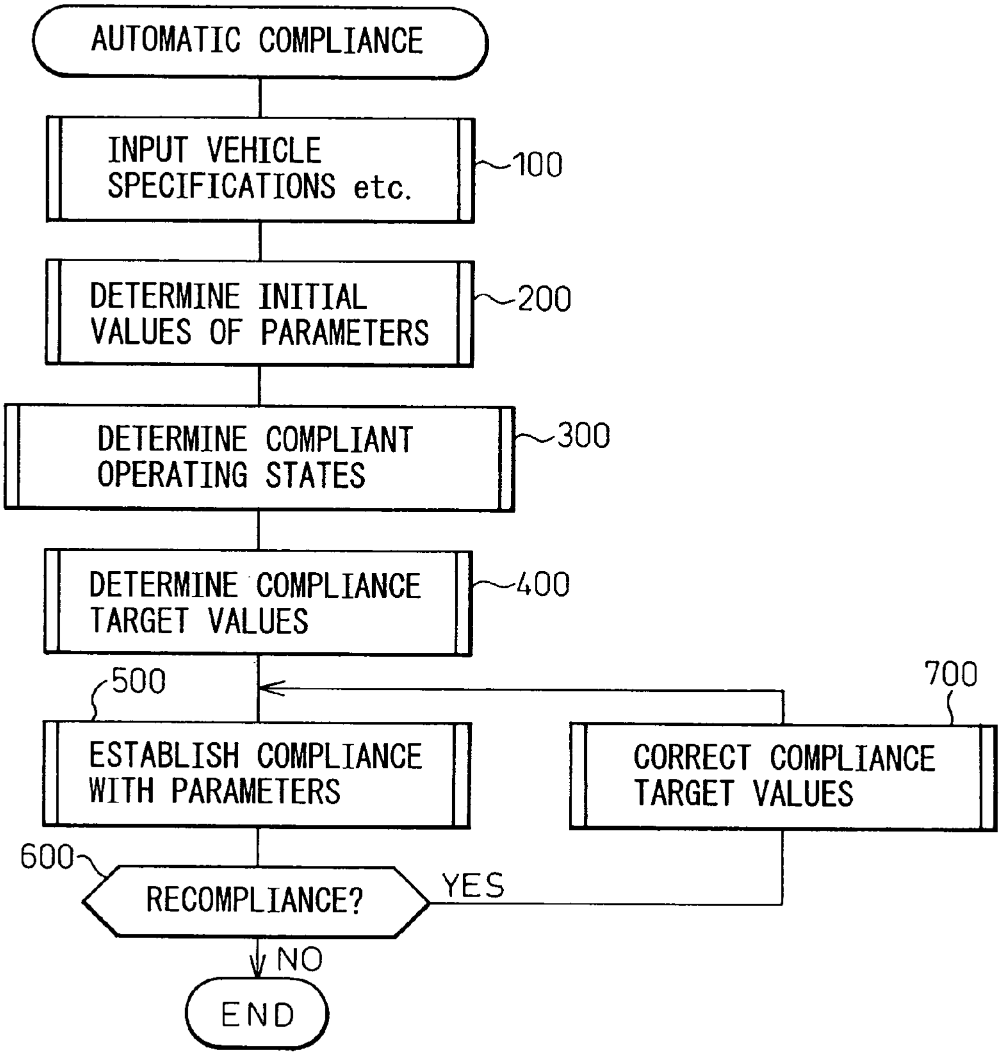
FIG. 2 is a flow chart of automatic compliance.
Figure 3:
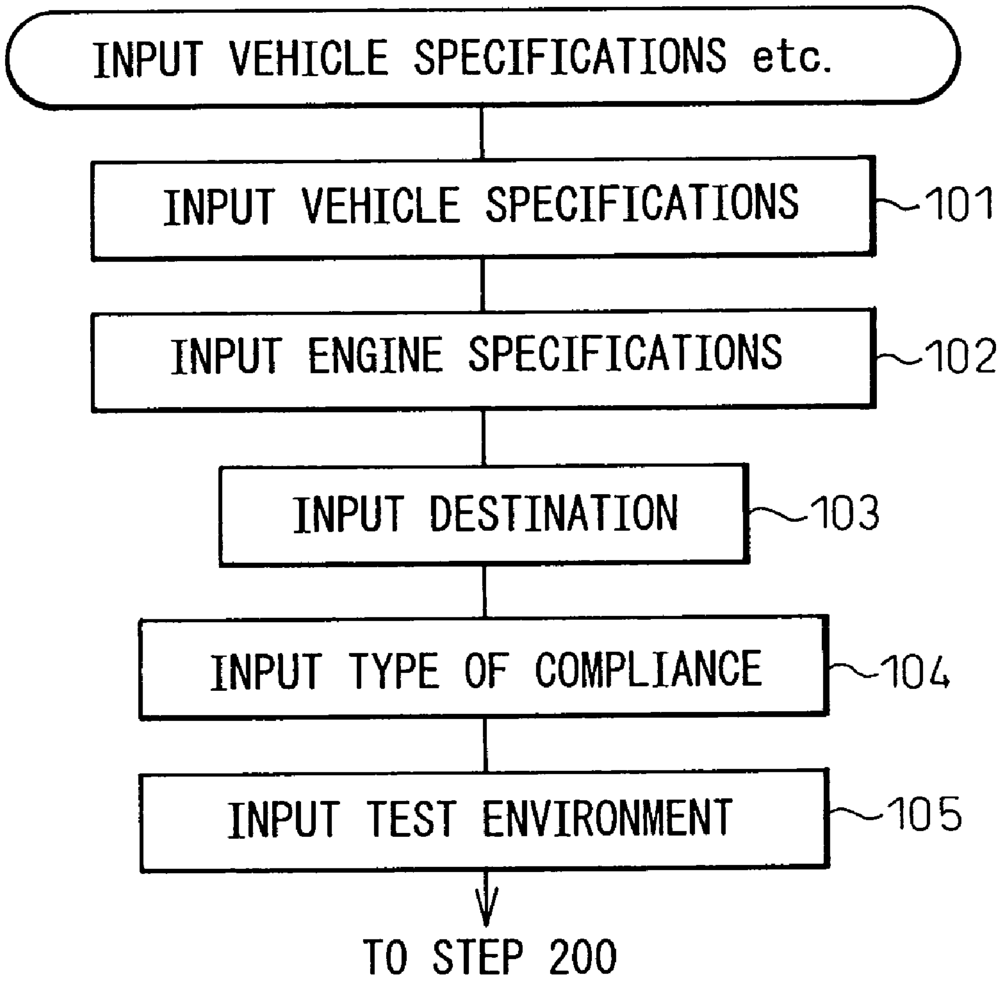
FIG. 3 is a flow chart of processing for input of vehicle specifications etc.
Figure 4:
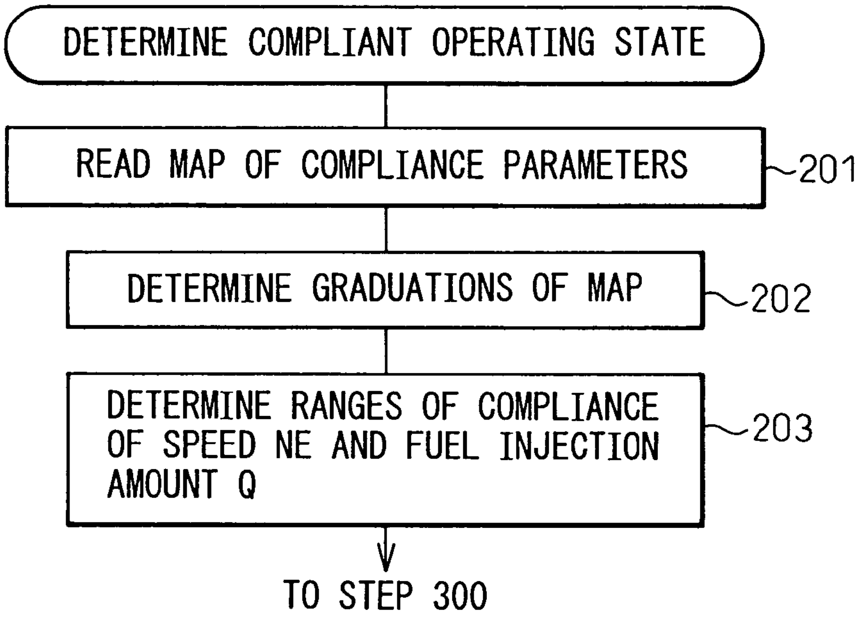
FIG. 4 is a flow chart of determination of compliant operating states.

Referring to FIG. 2, first, at step 100, the vehicle specifications etc. are input. The processing routine for input of the vehicle specifications etc. is shown in FIG. 3. Next, at step 200, a plurality of operating states for establishing compliance are determined. The processing routine for determination of the compliant operating states is shown in FIG. 4. Next, at step 300, the initial values of the plurality of parameters for control of the engine operation are set for the individual operating states for establishing compliance. Note that in the present invention, as parameters for control of the engine operation, all or part of a main injection timing, pilot injection timing, pilot injection amount, common rail pressure, opening degree of the EGR control valve, and opening degree of the variable nozzle of the turbocharger are employed.

Figure 7:
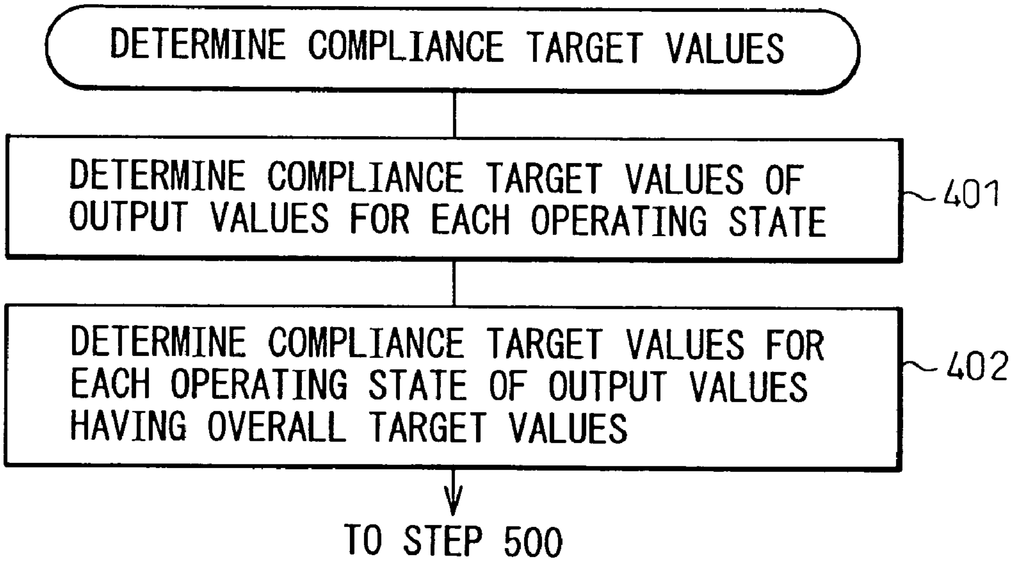
FIG. 7 is a flow chart of determination of a compliance target.

Next, at step 400, the compliance targets of a plurality of output values are determined. The processing routine for determination of the compliance targets is shown in FIG. 7. Note that in the present invention, as the output values, all or part of the emission, combustion noise, and fuel consumption are employed. As the emission, all or part of the amount of NOx in the exhaust gas, the concentration of smoke or amount of particulate, amount of hydrocarbons, and amount of CO are employed. Further, looking at the compliance targets, in the present invention, the compliance target values of the amount of NOx, the amount of particulate, amount of hydrocarbons, amount of CO, and fuel consumption among these output values are made the cumulative values, that is, the overall target values, when running in a test mode for evaluating the emission, and the compliance target values of the remaining output values, that is, the combustion noise and concentration of smoke, are made the target values in the individual compliant operating states. Further, also as for the amount of NOx, the amount of particulate, the amount of hydrocarbons, the amount of CO, and the fuel consumption for which overall target values are set, the compliance target values in the individual compliant operating states are set.

Figure 9:
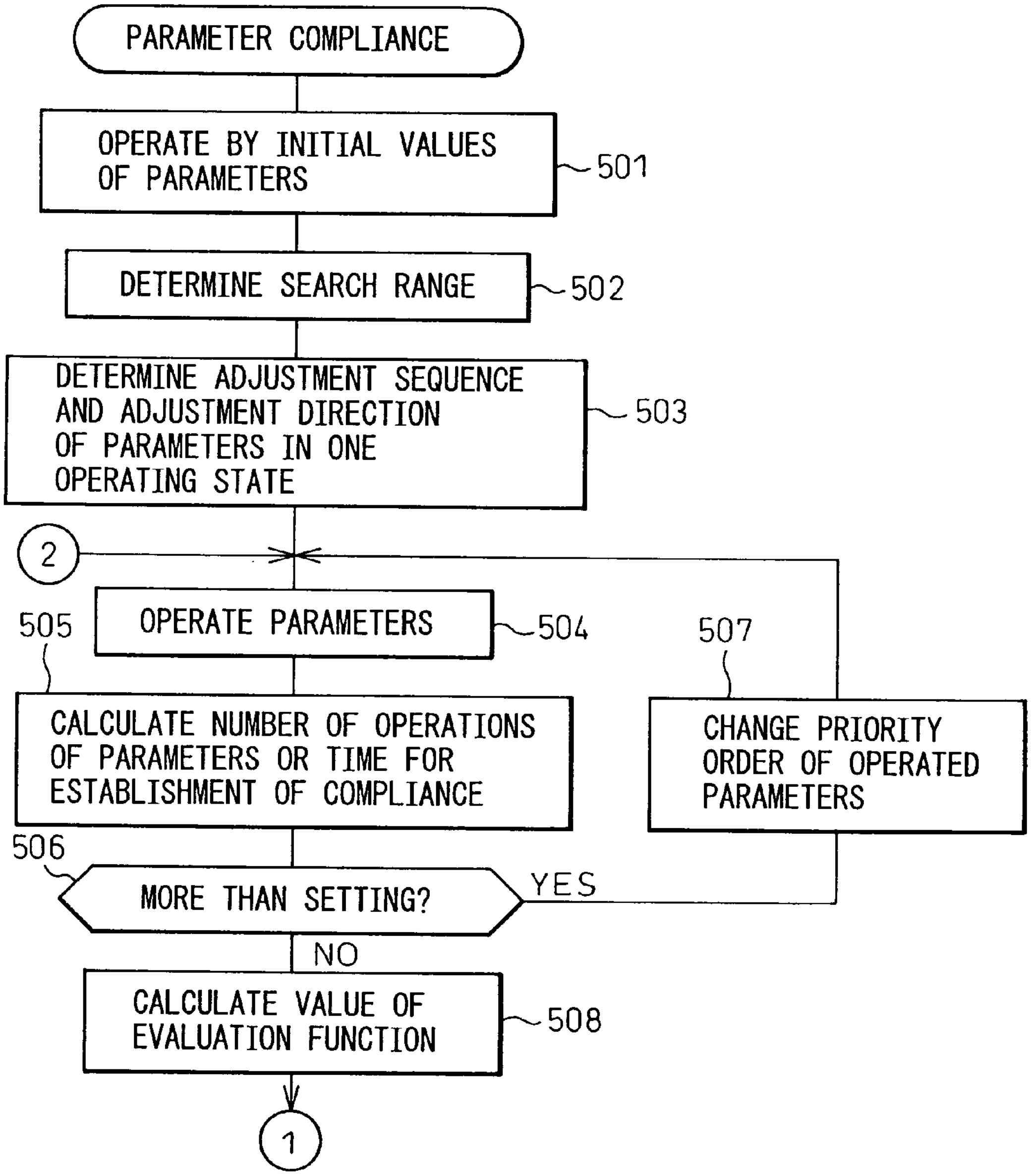
FIG. 9 is a flow chart of establishment of compliance for a parameter.
Figure 10:
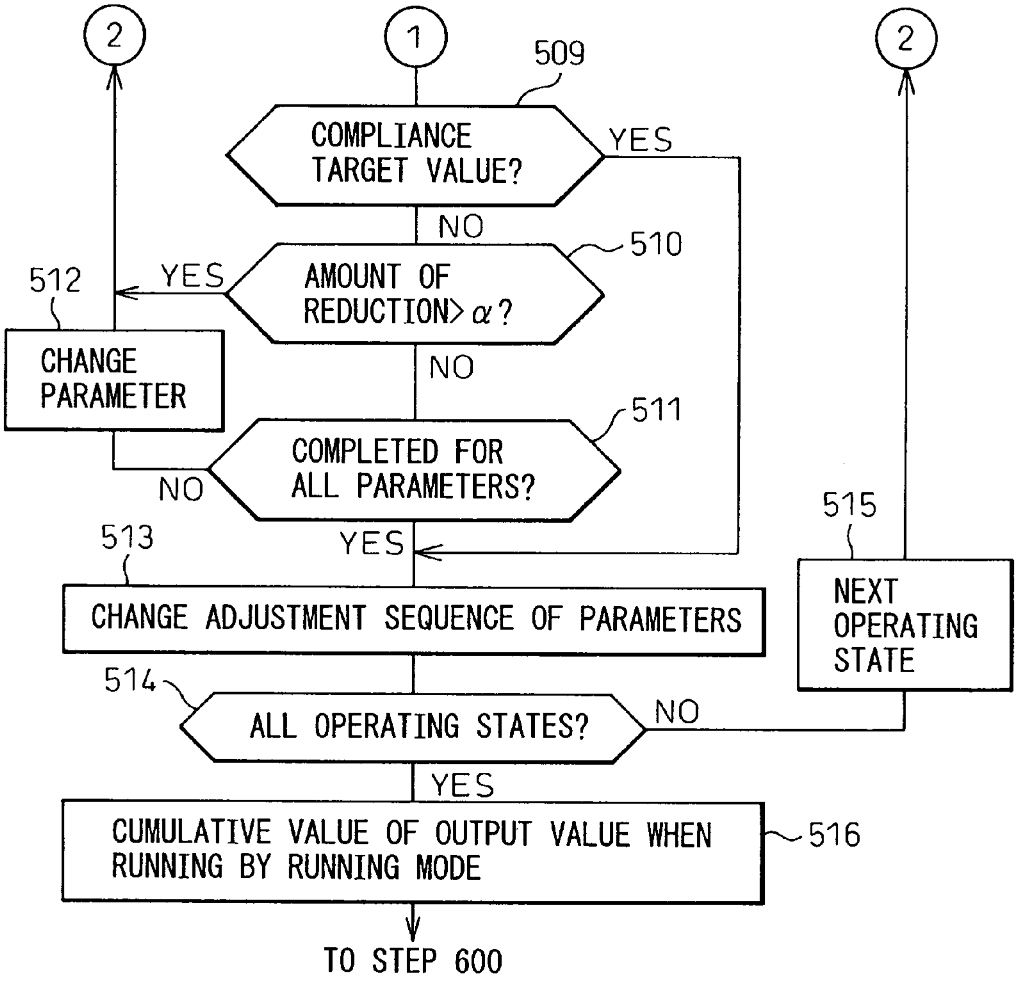
FIG. 10 is a flow chart of establishment of compliance for a parameter.
Figure 11:
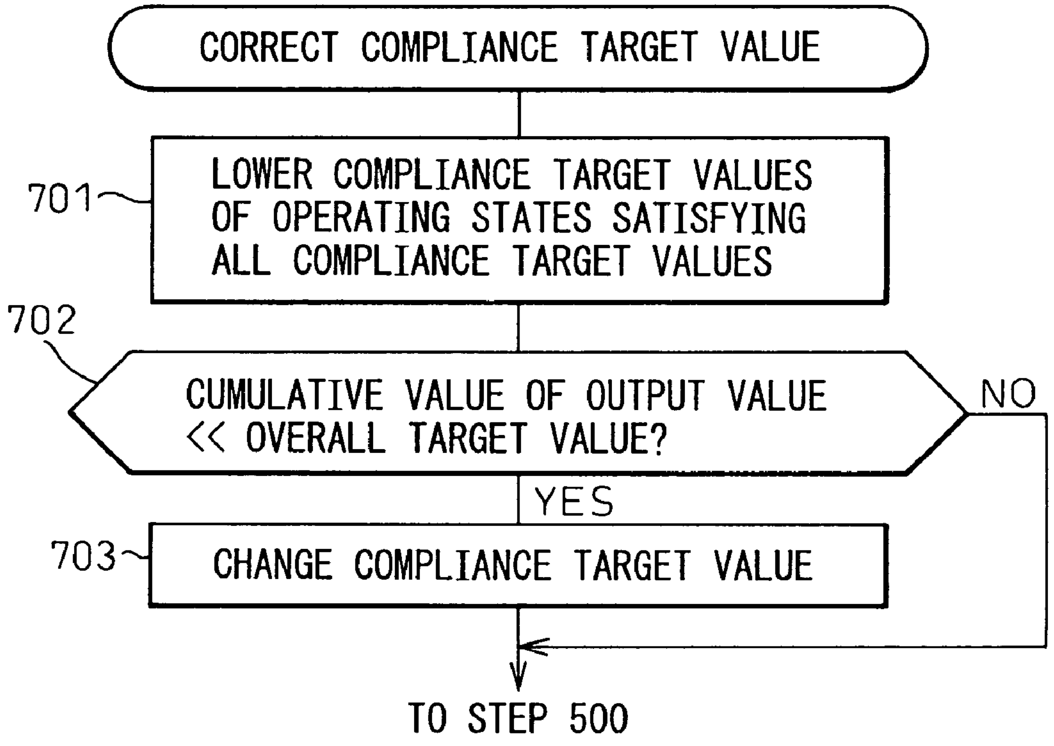
FIG. 11 is a flow chart of correction of a compliance target.

Next, at step 500, the adjustment sequences and adjustment directions of a plurality of parameters for reducing the output values exceeding compliance target values are determined and these parameters are sequentially adjusted in accordance with the determined adjustment sequences in the determined adjustment directions to establish compliance for these parameters. This processing routine for parameter compliance is shown in FIG. 9 and FIG. 10. Next, at step 600, it is judged if the establishment of compliance has been completed, that is, if reestablishment of compliance is required. When it is judged that establishment of compliance has been completed, the automatic compliance routine is ended. As opposed to this, when it is judged that reestablishment of compliance is necessary, the routine proceeds to step 700, where the compliance target values are corrected. The processing routine for correction of the compliance target values is shown in FIG. 11.

Next, the various processing routines will be sequentially explained with reference to FIG. 2 to FIG. 11.

In the processing routine for input of vehicle specifications etc. shown in FIG. 3, the vehicle specifications, engine specifications, and other information necessary for establishment of compliance are input when determining the operating states for establishment of compliance.

That is, first, at step 101, a diameter of the tires, a gear ratio of a transmission, a gear ratio of a differential gear, and other vehicle specifications are input. Next, at step 102, the displacement and other engine specifications are input. Next, at step 103, development target values of the output values and test mode for evaluating the emission (hereinafter referred to simply as the "test mode") and other specifications are input. Next, at step 104, the type of compliance, that is, compliance at the time of steady operation in the engine alone, compliance at the time of transient operation in the engine alone, compliance at the time of steady operation in a vehicle, and compliance at the time of transient operation in a vehicle, is input.

In this case, when compliance is established for at least one of the steady operation or transient operation in the engine alone or steady operation or transient operation in the vehicle, the values of the remaining parameters suitable for operation are found based on the parameter values for which compliance is established.

Next, at step 105, the test environment such as whether the environment in which the automobile is used is a cold location or high altitude location is input. When the test environment finishes being input, the routine proceeds to step 200 of FIG. 2 where the operating state for establishment of compliance is determined.

Figure 5:
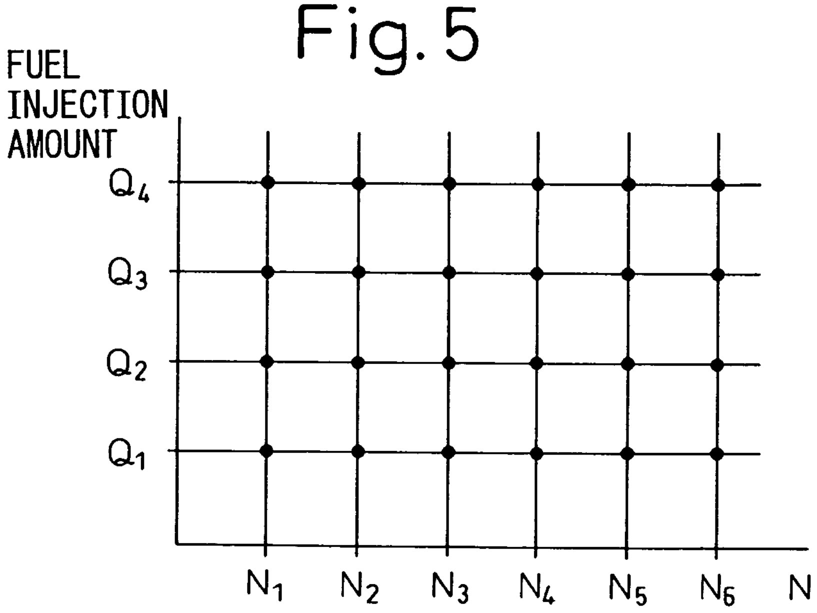
FIG. 5 is a map.

Referring to FIG. 4 showing the processing routine for determination of the compliant operating state, first, at step 201, a map of the parameters for which compliance is to be established is read. That is, the electronic control unit 40 shown in FIG. 1 stores a database. At step 201, the map suitable for the parameters for which compliance is to be established is read from this database. In this embodiment of the present invention, as shown in FIG. 5, this map is comprised of a map with the engine speed N along its abscissa and the fuel injection amount Q along its ordinate. The operating states for establishment of compliance are set as points on the map (black dots in FIG. 5). That is, the operating states for establishment of compliance are points determined by the engine speed N and the fuel injection amount Q.

Note that as the map in this case, it is also possible to use a map having the engine speed N along its abscissa and the output torque along its ordinate.

Next, at step 202, the graduations of the map, that is, the intervals between the points on the map, are determined based on the database. Next, at step 203, the ranges of the fuel injection amount Q and the engine speed N for which compliance is to be established are determined based on the database. Note that it is possible to calculate the fuel injection amount and engine speed used in the test mode from the input vehicle specifications and determine the ranges of the fuel injection amount and engine speed for establishment of compliance based on the results of calculation. When the ranges of the fuel injection amount and engine speed for establishment of compliance are determined, the routine proceeds to step 300 of FIG. 2, where the initial values of the parameters are determined.

Figure 6:
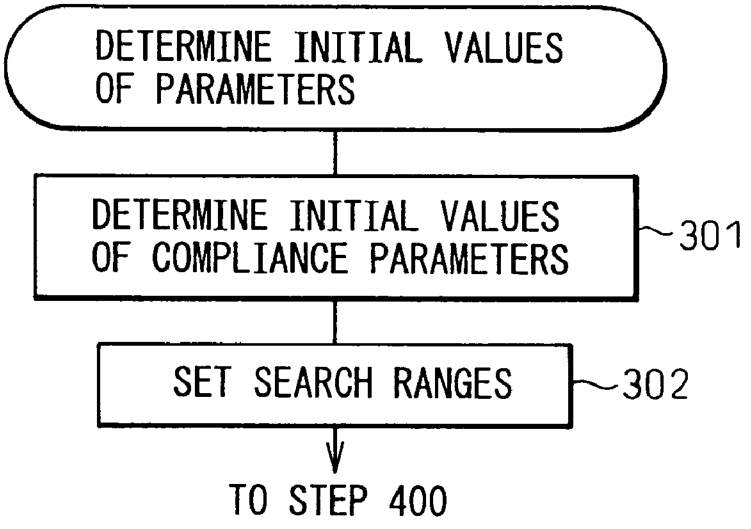
FIG. 6 is a flow chart of determination of the initial values of parameters.

Referring to FIG. 6 showing the processing routine for determining the initial values of the parameters, first, at step 301, the initial values of the parameters for establishment of compliance are determined. Here, the parameters for establishment of compliance, as explained above, are all or part of the main injection timing, pilot injection timing, pilot injection amount, common rail pressure, opening degree of the EGR control valve, opening degree of the intake throttle valve, and opening degree of the variable nozzle of the turbocharger. Further, the database stores in advance mean values of compliance of the parameters of existing engines having specifications corresponding to the engine specifications for establishment of compliance. At step 301, the mean values of compliance are used as the initial values of the parameters.

Next, at step 302, the ranges of search of parameters are set. In this embodiment of the present invention, the database stores in advance compliance values of existing engines having specifications corresponding to specifications of the engine for establishment of compliance. The ranges of search of the parameters for establishment of compliance are made the ranges of standard deviation about the mean values of compliance of the existing engines. If the ranges of compliance are set, the routine proceeds to step 400 of FIG. 2, where the compliance target values are determined.

Next, a processing routine for determining the compliance target values are explained with reference to FIG. 7.

As explained above, the output values for establishment of compliance covered by this compliance operation are all or part of the emission, combustion noise, and fuel consumption, while the emission is all or part of the amount of NOx in the exhaust gas, the concentration of smoke or the amount of particulate, the amount of hydrocarbons, and the amount of CO. On the other hand, looking at the compliance target values of the output values, as explained above, the compliance target values of the amount of NOx, amount of particulate, amount of hydrocarbons, amount of CO, and fuel consumption among these output values are the overall target values, i.e. the cumulative values when running in the test mode. The compliance target values of the remaining output values, that is, the combustion noise and concentration of smoke, are target values in the each compliant operating state. Further, compliance target values in the different compliant operating states are set together for the amount of NOx, amount of particulate, amount of hydrocarbons, amount of CO, and fuel consumption for which overall target values are set as well.

Now, in the routine for determining the compliance target values shown in FIG. 7, first, at step 401, the compliance target values for the output values without overall target values, that is, the combustion noise and the concentration of smoke, are determined. In this embodiment of the present invention, the database stores in advance compliance values of existing engines having specifications corresponding to the specifications of the engine for which compliance is to be established. The compliance target values of the combustion noise and concentration of smoke not having overall target values are made the mean values of compliance of the existing engines. Note that it is also possible to use values freely set as compliance target values of the output values not having overall target values.

Next, at step 402, the compliance target values for each operating state of the output values with overall target values, that is, the amount of NOx, the amount of particulate, the amount of hydrocarbons, the amount of CO, and the fuel consumption, are determined. Specifically speaking, in this embodiment of the present invention, development target values aimed at in advance are set as the overall target values. The compliance target values of the output values in the different operating states are determined so that the cumulative values of the output values when running in the test mode become less than the predetermined development target values. Below, the method of finding these compliance target values will be explained step by step.

In the present invention, to give general applicability to the method of finding the compliance target values, the ratios of the output values per unit time and unit engine output in each operating state with respect to the mean output values per unit time and unit engine output when running in the test mode in existing engines having specifications corresponding to the specifications of the engine for which compliance is to be established are stored in advance for each operating state. Further, to find the compliance target values of output values using these ratios, the mean target values per unit time and unit engine output when the cumulative values of the output values when running in the test mode are the development target values are calculated and the compliance target values of the output values at each operating state are calculated from the mean target values and the corresponding ratios.

Figure 8A:
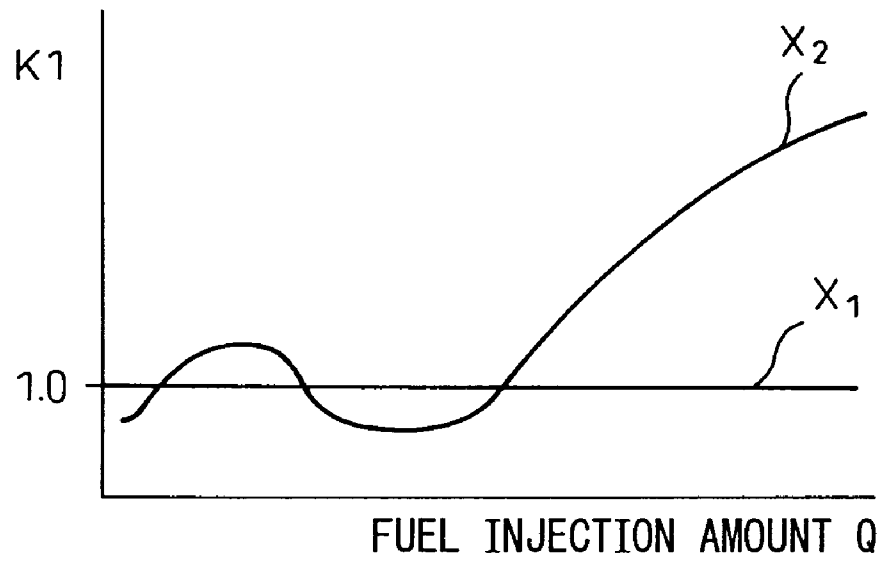
FIGS. 8A and 8B are views of a correction coefficient K1.
Figure 8B:
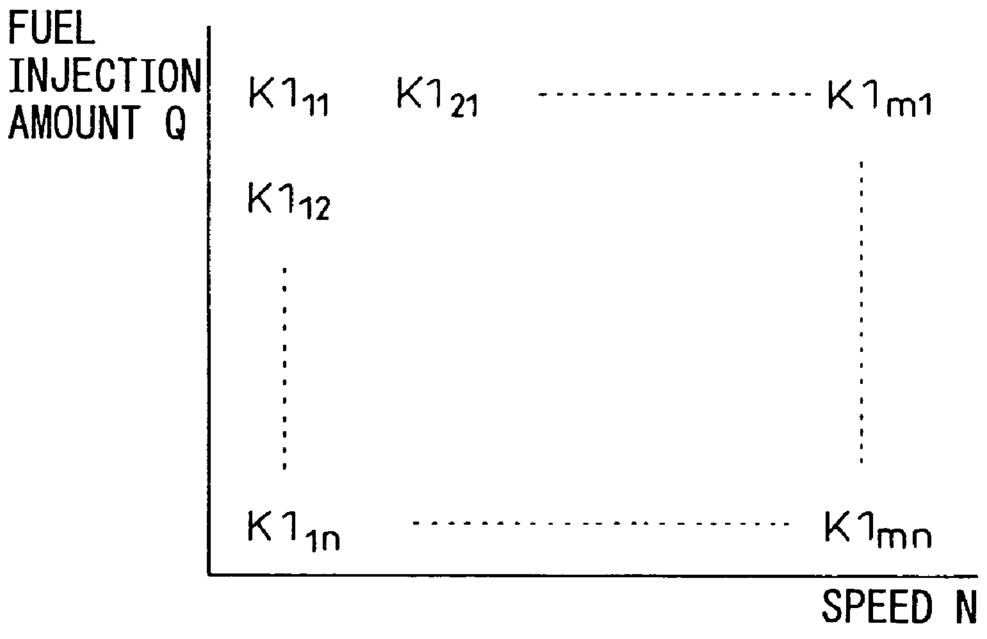

This will be explained in more detail taking as an example the case of finding the compliance target value of the amount of NOx. $X_1$ in FIG. 8A shows the mean amount of exhaust NOx (g/kWh) per unit time and unit engine output when running in the test mode in existing engines having specifications corresponding to the specifications of the engine for which compliance is to be established (simply called "existing engines"). $X_2$ in FIG. 8A shows the amount of exhaust NOx (g/kwh) per unit time and unit engine output in each operating state. On the other hand, the ordinate K1 of FIG. 8A shows the (amount $X_2$ of exhaust NOx in each operating state)/(mean amount $X_1$ of exhaust NOx), that is, the ratio of the amount $X_2$ of the exhaust NOx in each operating state with respect to the mean amount $X_1$ of the exhaust NOx, while the abscissa of FIG. BA shows the fuel injection amount Q. As will be understood from FIG. 8A, the ratio K1 changes greatly in accordance with the fuel injection amount Q. This ratio K1 is a function of not only the fuel injection amount Q, but also the engine speed N. Therefore, the ratios K1 in the existing engines are stored in advance in a database as a function of the speed N and the fuel injection amount Q in the form of a map as shown in FIG. 8B.

When the specifications of engines correspond, the result is almost the same ratio K1 even if the engines are different. Therefore, if using the ratio K1, if giving the mean amount $X_1$ of exhaust NOx, it is possible to determine the amount $X_2$ of NOx exhaust in each operating state, that is, the compliance target value. However, the ratio K1 is found based on existing engines, so the compliance target value obtained using the ratio K1 has to be corrected for each engine.

Next, the method of finding a compliance target value in each operating state at the engine for which compliance is to be established utilizing this ratio K1 will be explained.

First, the mean amount of the exhaust NOx per unit time and unit engine output when running in a test mode is calculated from the following formula:

Mean amount of exhaust NO*x* (g/kWh)=(development target value of amount of exhaust NO*x* (g/km)×test mode running distance (km))/time integral value of engine output when running in test mode (kWh)

The development target value per unit distance (g/km) when running in a test mode is set in advance in accordance with the destination. Therefore, the numerator of the above equation shows the amount of NOx exhaust (g) aimed at when running in a test mode. In this equation, the amount of NOx exhaust (g) is divided by the time integral value of the engine output (kWh). Therefore, the above formula indicates the mean amount of exhaust NOx per unit time and unit engine output (g/kWh).

Next, using the ratio K1 shown in FIG. 8B as the correction coefficient K1, the amount of exhaust NOx per unit time at each operating state, that is, the compliance target value, is calculated from the following equation:

Amount of exhaust NO*x* (g/h)=mean amount of exhaust NO*x* per unit engine output (g/kWh)×engine output (kW) at each operating state×correction coefficient *K*1

In this way, the amount of exhaust NOx per unit time (g/h) in each operating state for establishing compliance, that is, the compliance target value, is calculated.

Next, this compliance target value is used to check if the total amount of the amount of exhaust NOx satisfies the development target value when running in a test mode. When the total amount of the amount of exhaust NOx exceeds the development target value, the compliance target value is corrected. Using more general terms, it is assumed that the output value per unit time in each operating state becomes the calculated compliance target value, the cumulative value of the output value when running in the test mode is calculated, and when the cumulative value exceeds the development target value, the compliance target value of the output value at each operating state is corrected so that the cumulative value becomes less than the development target value.

Explaining this specifically taking as an example the case of finding the compliance target value of the amount of NOx, first, it is assumed that the amount of exhaust NOx per unit time in each operating state for establishment of compliance becomes the calculated amount of exhaust NOx (g/h), then the following equation is used to calculate the total amount of NOx (g) exhausted when running in a test mode.

Total amount of $NOx$ (g)=mean amount of exhaust $NOx$ per unit time and unit engine output (g/kWh)×time integral value of (engine output (kW) at each operating state×correction coefficient $K1$)(kWh)

When the total amount of NOx is less than the development target of the total amount of exhaust NOx, the compliance target value is not corrected. As opposed to this, when the total amount of NOx exceeds the development target value of the total amount of exhaust NOx, the amount of exhaust NOx per unit time (g/h) in each operating state for establishing compliance, that is, the compliance target value, is found again based on the following equation:

Amount of exhaust $NOx$ per unit time (g/h) in each operating state for establishing compliance, that is, compliance target value=mean amount of exhaust $NOx$ per unit time and unit engine output (g/kWh)×engine output at each operating state (kW)×correction coefficient $K1$×correction coefficient $K2$ Here, the correction coefficient K2 is expressed by the following equation:

Correction coefficient $K2$=(development target value of amount of exhaust $NOx$ (g/km)×distance of running in test mode (km))/total amount of $NOx$ (g)

In the above equation relating to the correction coefficient K2, the numerator shows the development target value for the total amount of exhaust NOx. Therefore, if cumulatively adding the amount of exhaust NOx per unit time (g/h) calculated using this correction coefficient K2, that is, the compliance target value, to find the total amount of the exhaust NOx when running in a test mode, the total amount of the exhaust NOx matches with the development target value of the total amount of the exhaust NOx. In this case, if using a value slightly smaller than the value of the correction coefficient K2 found from the above equation as the correction coefficient K2, the total amount of the NOx obtained by cumulatively adding the amount of exhaust NOx per unit time (g/h), that is, the compliance target value, becomes smaller than the development target value of the total amount of the exhaust NOx. The compliance target value of the amount of NOx at each operating state for establishment of compliance is calculated in this way.

The compliance target values in each operating state for establishment of compliance for the other output values having overall target values, that is, the amount of particulate, the amount of hydrocarbons, the amount of CO, and the fuel consumption, are found by the same method as the method for finding the compliance target value of the amount of NOx. If the compliance target values in each operating state for establishment of compliance are calculated for all output values having overall target values, the routine proceeds to step 500 of FIG. 2, where a compliance operation for parameters is performed.

Next, the compliance operation for parameters performed in the processing routine for establishing compliance of parameters shown in FIG. 9 will be explained.

First, at step 501, the engine is operated at one operating state among the operating states for establishment of compliance using the initial values of the parameters found at step 300 of FIG. 2 and the output values are measured. If there are any output values exceeding the compliance target value at that time, at step 502, the search ranges of the parameters are corrected in accordance with the extents by which the output values exceed the compliance target values. The smaller the extents of excess, the narrower the search ranges of the parameters. Further, at this time, if there are output values exceeding the compliance target values, the adjustment sequences and adjustment directions of the plurality of parameters for reducing the output values exceeding the target values at step 503 are determined.

In this way, the relationships between the adjustment sequences and adjustment directions of the parameters to be adjusted when output values exceed the compliance target values and the output values are stored in advance as shown in FIG. 12 and FIGS. 13A to 13C. When output values exceed the compliance target values, the adjustment sequences and adjustment directions of the parameters are determined based on the relationships shown in FIG. 12 and FIGS. 13A to 13C.

First, explaining FIG. 12, FIG. 12 shows an example of using the concentration of smoke, NOx, hydrocarbons, and combustion noise as output values and using the main injection timing, the pilot injection interval showing the interval between the main injection and pilot injection, pilot injection amount, common rail pressure, and EGR control valve as parameters for control of the engine operation. FIG. 12 shows the case where one of the output values exceeds the compliance target value. The output value exceeding the compliance target value is shown by the numeral 1 at the columns showing the output values. For example, at No. 1 of FIG. 12, the case where the concentration of smoke exceeds the compliance target value is shown.

On the other hand, the bracketed numerals in the columns showing the parameters show the adjustment sequences of the parameters. For example, in No. 1 of FIG. 12, the adjustment sequence is made the EGR control valve, the main injection timing, the common rail pressure, the pilot injection timing, and the pilot injection amount. This adjustment sequence is a sequence considering the large influence given on reduction of the corresponding output value (concentration of smoke at No. 1) from experience.

Further, the terms in the columns showing the parameters indicate the adjustment directions of the parameters. For example, they show that the adjustment direction of the EGR control valve at No. 1 is the direction for closing the EGR control valve. Further, when there are two terms in the columns showing the parameters, it means that either it is not known which adjustment direction will have an effect reducing the output value or the adjustment direction differs according to the injection timing. For example, at the main injection timing at No. 1, it is not known whether delaying the injection timing or advancing it will reduce the concentration of smoke. Further, at the main injection timing at No. 3, the terms indicate that injection timing should be delayed if BTDC (before top dead center) and advanced if ATDC (after top dead center).

FIGS. 13A to 13C, like FIG. 12, also shows an example of using the concentration of smoke, the NOx, hydrocarbons, and combustion noise as output values and using the main injection timing, pilot injection interval showing the interval between the main injection and pilot injection, the pilot injection amount, common rail pressure, and EGR control valve as the parameters for control of engine operation. FIGS. 13A to 13C show the relationship between the plurality of output values exceeding the compliance target values when a plurality of output values exceed compliance target values and the adjustment sequences and adjustment directions of the parameters to be adjusted. The adjustment sequences and the adjustment directions of the parameters to be operated can be changed in accordance with the sequence of deterioration of the output values.

The sequence of deterioration is shown by the numerals 1 and 2 in the columns showing the output values. For example, No. 1 of FIG. 13A shows that the concentration of smoke and amount of NOx exceed the compliance target values and that the extent by which the concentration of smoke exceeds the target is greater than the extent by which the amount of NOx exceeds the target. Therefore, in this case, the concentration of smoke becomes the deterioration sequence 1 and the NOx becomes the deterioration sequence 2.

On the other hand, in FIGS. 13A to 13C as well, in the same way as in FIG. 12, the bracketed numerals in the columns showing the parameters show the adjustment sequences of the parameters. The terms in the columns showing the parameters show the adjustment directions of the parameters. Further, the empty spaces in the columns showing the parameters mean the corresponding parameters are not adjusted.

Now, at step 503, when the adjustment sequences and adjustment directions of the parameters in one operating state are determined from a relationship shown in FIG. 12 or FIGS. 13A to 13C, the routine proceeds to step 504, where the adjustment of the parameters is started in accordance with the relationship shown in FIG. 12 or FIGS. 13A to 13C. For example, when operating the engine using the initial values of the parameters and as a result the amount of NOx greatly exceeds the compliance target value and the combustion noise exceeds the compliance target value just a little, that is, the state becomes that of No. 9 of FIG. 13C, the adjustment is started by delaying the main injection timing if the main injection timing is BTDC.

Next, at step 505, the number of adjustments of the parameters or the time required for establishing compliance, that is, the compliance establishment time, is calculated. Next, at step 506, it is judged if the number of adjustments of the parameters or the time required for establishing compliance exceeds a predetermined setting. If the number of adjustments of parameters or the time required for establishing compliance exceed a predetermined setting, it is judged difficult for all output values to satisfy the compliance target values unless performing a recompliance operation and the routine proceeds to step 507, where the priority order of the parameters is changed to give priority to the compliance operation on output values not having overall target values. For example, in the state of No. 9 of FIG. 13C, if time is required for searching for parameters using the amount of NOx as a compliance target value, the search for the parameters using the amount of NOx as the compliance target value is suspended and a search for parameters using the combustion noise as the compliance target value is started.

On the other hand, when it is judged at step 506 that the number of adjustments of parameters or the time required for compliance does not exceed a predetermined setting, the routine proceeds to step 508, where the value of an evaluation function is calculated.

That is, if adjusting one parameter, all output values are influenced in some way. At this time, there are output values which decline, output values which increase, and output values which do not change much at all. Therefore, it is necessary to evaluate whether adjusting this parameter would be meaningful in the compliance operation. Therefore, it is necessary to evaluate the changes in output values when adjusting the parameter. Therefore, in the present invention, provision is made of an evaluating means for evaluating the changes of output values when adjusting a parameter and a compliance operation for parameters is performed in accordance with the evaluation by this evaluating means.

As the evaluating means, various evaluating means may be considered, but in this embodiment of the present invention, an evaluation function expressing the ratios of the output values to the compliance target values is used and this evaluation function is utilized to evaluate the changes in the output values.

The evaluation function used in the embodiments of the present invention is as follows:

Evaluation function=amount of exhaust NOx/compliance target value+concentration of smoke/compliance target value+amount of exhaust hydrocarbons/compliance target value+combustion noise/compliance target value If using this evaluation function, when all of output values become the compliance target values, the value of the evaluation function becomes 4.0. Further, when only the amount of exhaust NOx exceeds the compliance target value and the rest of the output values are the compliance target values, the value of the evaluation function becomes more than 4.0. Further, when using the evaluation function, when an output value becomes smaller than the compliance target value, the target is satisfied, so the output value/compliance target value is made 1.0. Therefore, when using this evaluation function, if the value of the evaluation function falls when adjusting a parameter, it means that the output value is moving toward the compliance target value. If the value of the evaluation function increases, it means that the output value is moving in a direction away from the compliance target value. Therefore, whether or not there is any meaning in adjusting a certain parameter in performing a compliance operation can be judged from the change of the value of the evaluation function.

When the value of the evaluation function is calculated at step 508, the routine proceeds to step 509, where it is judged if all output values exceeding the compliance target values satisfy the compliance target values. When all of the output values exceeding the compliance target values do not satisfy the compliance target values, the routine proceeds to step 510, where it is judged if the output values are falling in trend. Specifically speaking, it is judged if the amount of reduction of the evaluation function is more than a predetermined prescribed value a. When the output values are falling in trend, specifically speaking when the amount of reduction of the evaluation function is more than a predetermined prescribed value a, the same parameter continues to be adjusted. When in the state of No. 9 of FIG. 13C, adjustment for delaying the main injection timing continues to be performed. This adjustment of the parameter is performed in the range where no misfires occur so long as it is judged at step 510 that the output values are falling in trend.

On the other hand, when it is evaluated at step 510 that the output values have not changed much at all or when it is evaluated that the output values are rising in trend, specifically speaking when the amount of reduction of the evaluation function is less than a predetermined prescribed value α or the value of the evaluation function rises, the routine proceeds to step 511, where it is judged if the adjustment has been completed for all parameters. When the adjustment has been completed for all parameters, the routine proceeds to step 513. As opposed to this, when the adjustment has not been completed for all parameters, the routine proceeds to step 512, where the parameter to be adjusted is changed to the next parameter in accordance with the adjustment sequence of parameters shown in FIG. 12 or FIGS. 13A to 13B. When in the state of No. 9 of FIG. 13C, the parameter to be adjusted is changed from the main injection timing to the opening degree of the EGR control valve and then adjustment for opening the EGR control valve is started.

On the other hand, when it is judged at step 509 that all output values exceeding the compliance target values satisfy the compliance target values, the routine jumps to step 513, where an operation for changing the adjustment sequence of the parameters is performed. That is, in this embodiment of the present invention, the amount of reduction of the evaluation function when adjusting parameters in an operating state where a compliance operation had been performed is learned and the adjustment sequence of the parameters in that operating state is changed to an order of the magnitude of the amount of reduction of the evaluation function.

Next, at step 514, it is judged with the compliance operation has been completed for all operating states. When it is judged that the compliance operation has not been completed for all operating states, the routine proceeds to step 515, where the routine shifts to the compliance operation for the next operating state for establishing compliance. As opposed to this, when the compliance operation has been completed for all operating states, the routine proceeds to step 516, where the cumulative values of the output values when running in the test mode are calculated. Next, the routine proceeds to step 600 of FIG. 2.

At step 600, it is judged if the compliance operation should be performed again. When a cumulative value calculated at step 516 of FIG. 10 exceeds the development target value or when there is leeway with respect to the development target value, it is judged that it is necessary to perform the compliance operation again and the routine proceeds to step 700, where the processing for correction of the compliance target value is performed. As opposed to this, when the cumulative value calculated at step 516 does not exceed the development target value and there is no leeway with respect to the development target value, the compliance processing is completed.

Next, recompliance processing will be explained with reference to FIG. 11.

First, at step 701, operating states satisfying all compliance target values are extracted from the operating states for which compliance is established and the compliance target values of the output values not satisfying the overall target values among the compliance target values in the operating states satisfying all compliance target values are lowered.

Specifically, for example, operating states satisfying all compliance target values among the operating states determined by the engine speed N and the fuel injection amount Q are extracted (operating states shown by O mark in FIG. 14). Next, the compliance target values of the output values not satisfying the overall target values among the compliance target values in the operating states shown by the O marks in FIG. 14 are made lower. If the compliance target values of the output values not satisfying the overall target values are made lower, the cumulative values of the output values decline, so in the end the overall target values are satisfied.

Note that in this case, the extent of the drop in the compliance target values is determined for each operating state in accordance with the frequency of use in the test mode. The higher the frequency of use in the test mode of the operating state, the greater the extent the drops in the compliance target values is made.

Next, at step 702, it is judged if the cumulative values of the output values among the output values having overall target values satisfy the overall target values by output values lower by at least a predetermined setting from the overall target values, that is, with leeway.

When the cumulative values of the output values having overall target values are not lower from the overall target values by at least the setting, the routine proceeds to step 500, where an operation for establishing compliance for the parameters again is performed.

As opposed to this, when the cumulative values of the output values having overall target values are lower from the overall target values by at least the setting, the routine proceeds to step 703, where the compliance target values in each operating state of these output values, that is, the output values satisfying the overall target values with leeway, are increased, the operating states not satisfying the compliance target values for outputs other than these output values are extracted, and the compliance target values in the operating states are lowered. More specifically, operating states not satisfying all compliance target values (shown by X marks in FIG. 14) are extracted and the compliance target values in the operating states not satisfying the compliance target values among the compliance target values of output values other than the output values satisfying the overall target values with leeway are lowered.

Even if increasing the compliance target values in each operating state of the output values satisfying the overall target values by leeway in this way, since there is leeway in the overall target values, the overall target values continue to be satisfied. As opposed to this, since the compliance target values of output values other than the output values satisfying the overall target values with leeway are lowered, in the end, all output values come to satisfy the compliance target values in an operating state not satisfying all compliance target values.

Note that it is possible to lower the compliance targets of the output values other than the output values satisfying the overall target values by a leeway for operating states with no leeway in the compliance target values among the operating states satisfying all of the compliance target values at that time (shown by the O marks in FIG. 14).

Next, an automobile designed for automatic compliance onboard will be explained with reference to FIG. 15.

Figure 15:
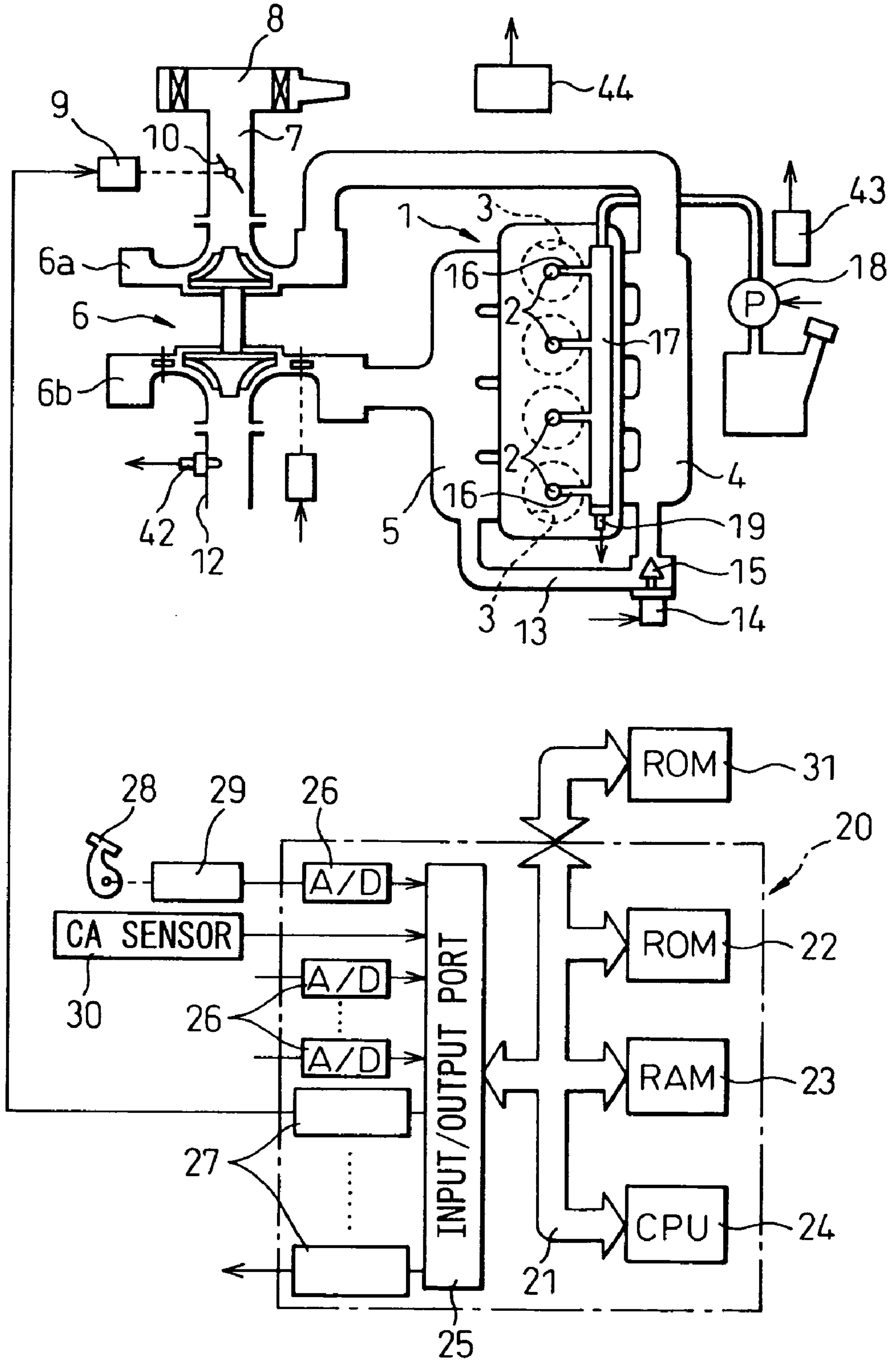
FIG. 15 is an overview of an internal combustion engine.

FIG. 15 shows an engine body 1 and electronic control unit 20 mounted in an automobile. In this case, a vehicle model is used which outputs output values of the automobile when vehicle control parameters (these parameters including engine control parameters) are input for establishing compliance. Therefore, in this case, the output values used when adjusting the parameters are the values calculated using the vehicle model. For the rest of the points, the compliance work is performed using a routine the same as the routine shown in FIG. 2. Note that this compliance work can also be performed at the time of factory shipment or when replacing batteries or performed during vehicle operation.

Note that as shown in FIG. 15, the exhaust component analyzer 42, fuel consumption meter 43, combustion noise meter 44, etc. are used to measure the actual output values of the vehicle. The vehicle model is corrected based on the measured output values.

Further, as shown in FIG. 15, the bidirectional bus 21 of the electronic control unit 20 may be connected to an exchangeable storage medium 31 such as a CD-ROM. This vehicle model may also be stored in the storage medium 31. Further, the computer may also store a program for realizing the automatic compliance method according to the present invention in this storage medium 31.

Further, it is preferable that, when moving into a region of different exhaust emission control values or running mode with respect to exhaust emission controls, the emission control values or running mode be automatically switched based on information emitted from a communications station. Therefore, it is also possible to configure the automobile to receive the running mode by a communications means from the outside.

In the embodiments explained up to here, as shown in FIGS. 13A to 13C, the relationships between the plurality of output values exceeding the compliance target values and the adjustment sequences and adjustment directions of the parameters to be adjusted are preset for the case where a plurality of output values exceed the compliance target values, and the adjustment sequences and the adjustment directions of the parameters to be adjusted are determined in accordance with the sequence of deterioration of the output values. As shown in FIG. 12, however, it is also possible find in advance only the relationships between the output values for the case where one output value exceeds the compliance target value and the adjustment sequences and adjustment directions of the parameters to be adjusted and determine the adjustment sequences and adjustment directions of the parameters to be adjusted from these relationships when a plurality of output values exceed the compliance target values. Next, an embodiment designed for determining the adjustment sequences and adjustment method of the parameters to be adjusted will be explained with reference to FIG. 16 to FIG. 21.

FIG. 16 shows the adjustment sequence and adjustment direction of the parameters to be adjusted for two representative output values, that is, for the concentration of smoke and the amount of exhaust NOx. Further, FIG. 16 shows the case where one of the output values exceeds the compliance target value by a manner of expression similar to FIG. 12. Note that in this embodiment, an internal combustion engine different from the internal combustion engine shown in FIG. 1 or FIG. 15 is used. Therefore, the parameters to be adjusted for the output values and the adjustment sequences and adjustment directions of the parameters differ somewhat in FIG. 16 and FIG. 12.

FIG. 17 rewrites the adjustment of the parameters shown in FIG. 16 and therefore FIG. 16 and FIG. 17 express exactly the same things.

Referring to FIG. 17, the adjustment at the adjustment sequence 1 when the concentration of smoke deteriorates is adjustment for closing the EGR control valve, while the adjustment at the adjustment sequence 2 is adjustment for increasing the common rail pressure. On the other hand, the adjustment at the adjustment sequence 1 when the NOx deteriorates is adjustment for opening the EGR control valve, while the adjustment at the adjustment sequence 2 is adjustment for reducing the common rail pressure. In this embodiment, when either of the concentration of smoke or the NOx deteriorates, the corresponding parameters are adjusted by the adjustment sequence shown in FIG. 17.

As opposed to this, when both the concentration of smoke and the NOx deteriorate, basically the adjustment is started from the parameters for the output value with the highest extent of deterioration at the adjustment sequence 1. That is, when the extent of deterioration of the concentration of smoke is higher than the extent of deterioration of the NOx, at the adjustment sequence 1, first adjustment is performed for closing the EGR control valve so as to reduce the concentration of smoke, then adjustment is performed for opening the EGR control valve to reduce the NOx.

However, from FIG. 17, it is learned that if the EGR control valve is opened, there is a possibility that the concentration of smoke will increase, while if the EGR control valve is closed, there is a possibility that the concentration of smoke will decrease. That is, if the EGR control valve is opened or closed, there is the possibility of a relationship where if the concentration of smoke decreases, the NOx will increase, while if the NOx increases, the concentration of smoke will increase, that is, a tradeoff, occurring. If there is such a tradeoff, even if the EGR control valve is adjusted to open or close, it will become impossible to simultaneously reduce the concentration of smoke and the NOx. Therefore, in this embodiment, first, it is judged if such a tradeoff occurs.

Figure 18A:
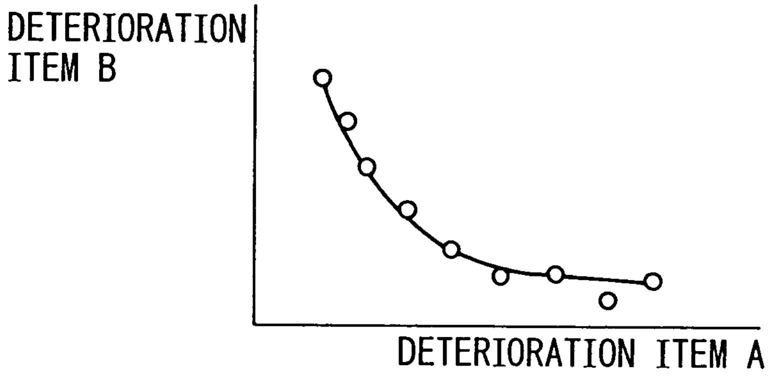
FIGS. 18A, 18B, and 18C are views for explaining the tradeoff between two output values.
Figure 18B:
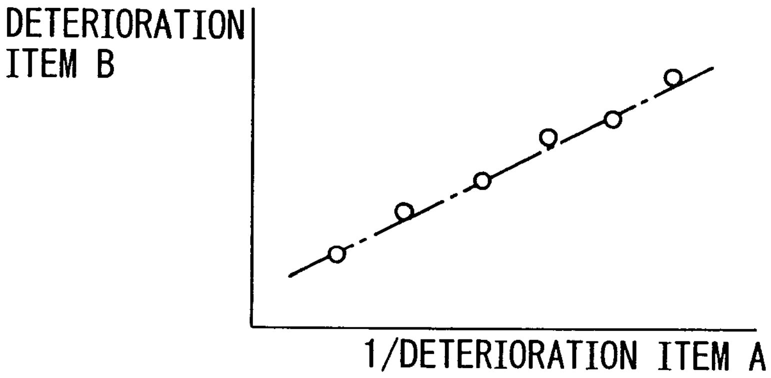

That is, when two output values deteriorate, if the deteriorated output values are designated the deteriorated item A and deteriorated item B, if the deteriorated item A and the deteriorated item B are in a tradeoff with respect to a certain parameter, when the value of the parameter is changed, the deteriorated item A and the deteriorated item B will enter the relationship shown in FIG. 18A. If the reciprocal of the deteriorated item A is taken, then the relationship becomes as shown in FIG. 18B. That is, if the abscissa is made 1/deteriorated value A and the ordinate is made the deteriorated value B, the relationship between the two will become an inclined straight line.

Figure 18C:
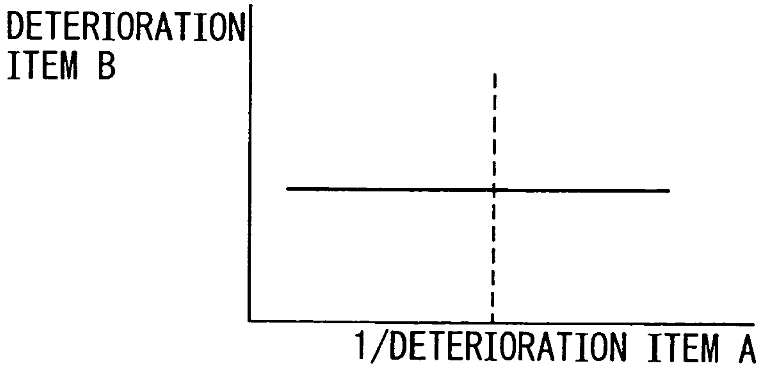

As opposed to this, if the deteriorated item A and the deteriorated item B are not in a tradeoff, the relationship between the two will become a horizontal line or a vertical line as shown by the solid line or broken line in FIG. 18C. In this way, it is possible to judge from the relationship of the 1/deteriorated item A and deteriorated item B if the deteriorated item A and deteriorated item B are in a tradeoff. In this case, in this embodiment according to the present invention, when a plurality of output values exceed the compliance targets, the top two output values in extent of deterioration among these output values are extracted and it is judged if these two output values enter a tradeoff.

Returning again to FIG. 17, the output values adjusted at the adjustment sequence 3 when the concentration of smoke and the amount of exhaust NOx deteriorate in common are the same and the adjustment directions are the same. The same is true for the adjustment sequences 4 to 6 as well. Therefore, at these adjustment sequences 3 to 6, the concentration of smoke and the amount of exhaust NOx are believed not to cause a tradeoff when adjusting the corresponding parameters.

As opposed to this, when adjusting the corresponding parameters as explained above at the adjustment sequences 1 and 2, there is the possibility of the concentration of smoke and the amount of exhaust NOx entering a tradeoff. When it is judged that the concentration of smoke and the amount of exhaust NOx are in the relationship shown in FIG. 18C, that is, when it is judged that the concentration of smoke and the amount of exhaust NOx are in a tradeoff, the parameters are adjusted in accordance with the adjustment sequence at FIG. 17 and with priority given to the output values with high extents of deterioration.

That is, in FIG. 17, when the extent of deterioration of the concentration of smoke is greater than the extent of deterioration of the NOx, as shown in FIG. 19, first the EGR control valve is closed, then the EGR control valve is opened, then the common rail pressure is increased, then the common rail pressure is decreased.

Expressing this in general terms, when the output values are not in a tradeoff with a common parameter, the other parameters with different adjustment sequences are adjusted starting from the parameter with the earliest adjustment sequence, while parameters with the same adjustment sequences are adjusted in order from the parameter for the output value with the highest degree of deterioration.

On the other hand, when it is judged that the concentration of smoke and the amount of exhaust NOx have the relationship shown in FIG. 18B with respect to opening/closing of the EGR control valve and increasing/decreasing of the common rail pressure, that is, the concentration of smoke and the NOx are in a tradeoff, the adjustments of the adjustment sequences 1 and 2 in FIG. 17 are not performed and, for the adjustments of the remaining adjustment sequences 3 to 6, the parameters are adjusted in accordance with the adjustment sequences and with priority given to the output values with high extents of deterioration.

That is, in FIG. 17, when the extent of deterioration of the concentration of smoke is greater than the extent of deterioration of the NOx, as shown in FIG. 20, first the amount of pilot injection is increased, then the amount of pilot injection is decreased, then the pilot injection intervals are decreased.

Expressing this in general terms, when output values are in a tradeoff with a common parameter, that parameter is not adjusted. The other parameters with different adjustment sequences are adjusted starting from the parameter with the earliest adjustment sequence, while parameters with the same adjustment sequences are adjusted in order from the parameter for the output value with the highest degree of deterioration.

The adjustment sequences and adjustment directions of the parameters according to the embodiment shown in FIG. 16 to FIG. 20 are determined at step 503 of the routine for establishing compliance of parameters shown in FIG. 9. The routine for determination of the adjustment sequences and adjustment directions of the parameters is shown in FIG. 21.

Figure 21:
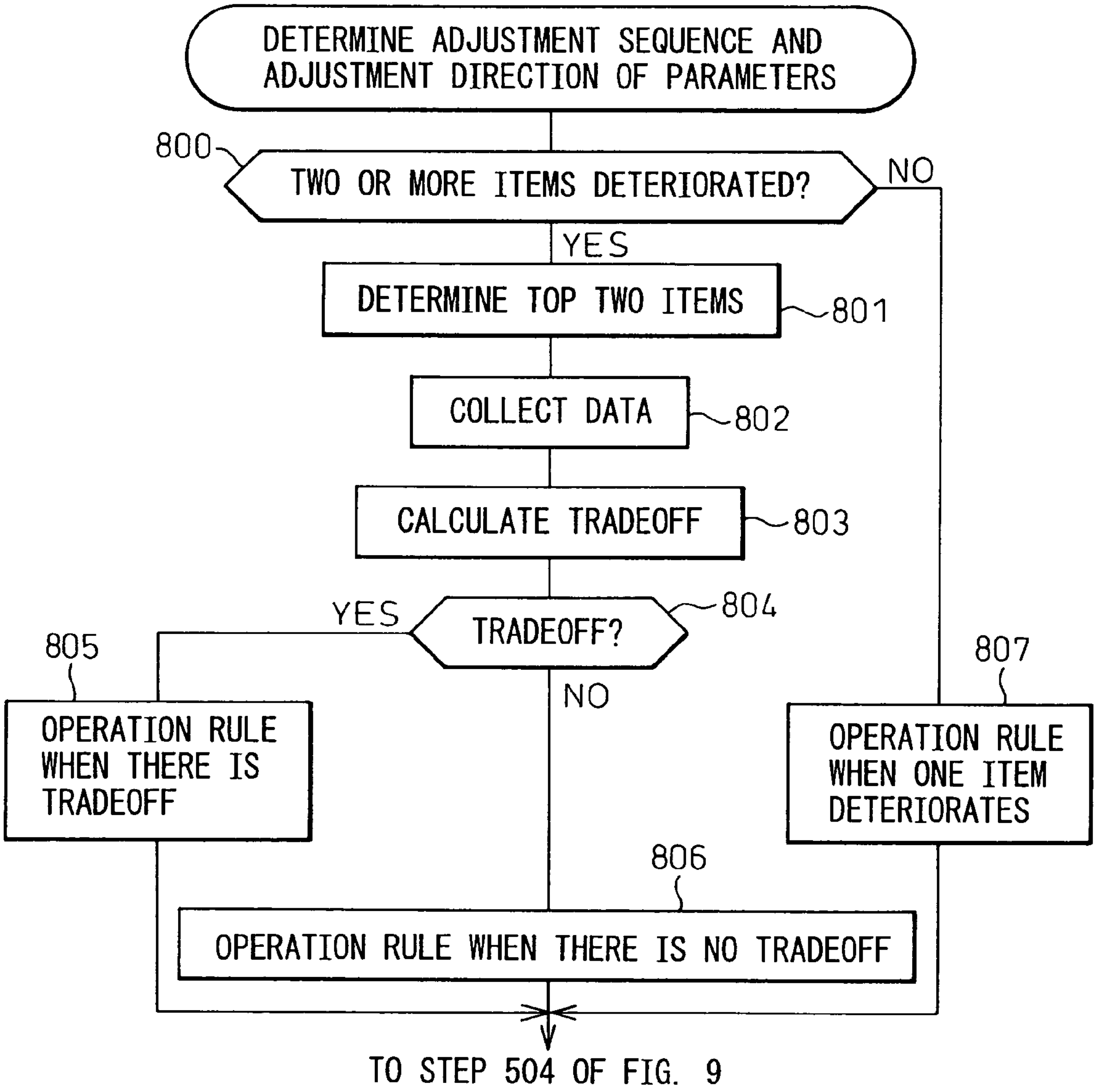
FIG. 21 is a flow chart of determination of a sequence of operation of a parameter and a direction of operation.

Referring to FIG. 21, first, at step 800, it is judged if two or more of the output values have deteriorated. If two or more of the output values have not deteriorated, the routine proceeds to step 807, where the parameters are adjusted for the deteriorated output values in accordance with predetermined adjustment rules such as shown in FIG. 17. As opposed to this, when it is judged at step 800 that two or more output values have deteriorated, the routine proceeds to step 801, where the higher two items, that is, the most deteriorated output value and the second most deteriorated output value, are determined.

Next, at step 802, data is collected showing the relationship between these two output values with respect to the parameters to be adjusted such as shown in FIG. 18A. As this data, it is possible to use data accumulated up to then as well and it is possible to use newly collected data. Next, at step 803, the relationship between the two when using one output value as the ordinate and using the reciprocal of the other output value as the abscissa, that is, the tradeoff formula, i.e. the approximation formula passing through the O mark such as shown by the straight line in FIG. 18B, is calculated. There are various methods for finding this approximation formula. Here, the explanation will be omitted.

Next, at step 804, it is judged from the inclination of the tradeoff formula whether the state is like that of FIG. 18B or like FIG. 18C, that is, if there is a tradeoff. If it is judged that there is no tradeoff, the routine proceeds to step 806, where the parameters are adjusted by adjustment rules such as shown in FIG. 19, while if it is judged that there is a tradeoff, the routine proceeds to step 805, where the parameters are adjusted by the adjustment rules such as shown in FIG. 20.

Next, an embodiment for improving the fuel consumption will be explained.

If the fuel injection timing is advanced, the fuel consumption is improved. However, if the fuel injection timing is advanced, the NOx is increased. Therefore, when compliance of all output values finishes, it is not possible to advance the fuel injection timing so long as there is no leeway in the NOx. Therefore, in this embodiment, when all output values satisfy the compliance targets due to the automatic compliance routine shown in FIG. 2 and there is leeway in the NOx at this time, processing is performed for improvement of the fuel consumption.

That is, explaining this in a little more detail, in this embodiment, the output values are all or part of the emission, combustion noise, and fuel consumption, the emission is all or part of the amount of NOx in the exhaust gas, the concentration of smoke or the amount of particulate, the amount of hydrocarbons, and the amount of CO, and the compliance target of the amount of NOx is the cumulative value when running in a test mode for evaluation of the emission, that is, the overall target. When the compliance operation for all operating states has been completed, the cumulative value of the amount of NOx when running in the test mode is calculated and processing is performed for improvement of the fuel consumption when there is leeway in the cumulative value of the calculated amount of NOx with respect to the overall target. In this case, in this embodiment of the present invention, this processing for improvement of the fuel consumption is comprised of processing for increasing the compliance target of NOx and advancing the fuel injection timing in operating state where the fuel consumption should be improved.

Next, the processing for improvement of the fuel consumption will be explained with reference to FIG. 22 to FIGS. 26A, 26B.

Figure 22:
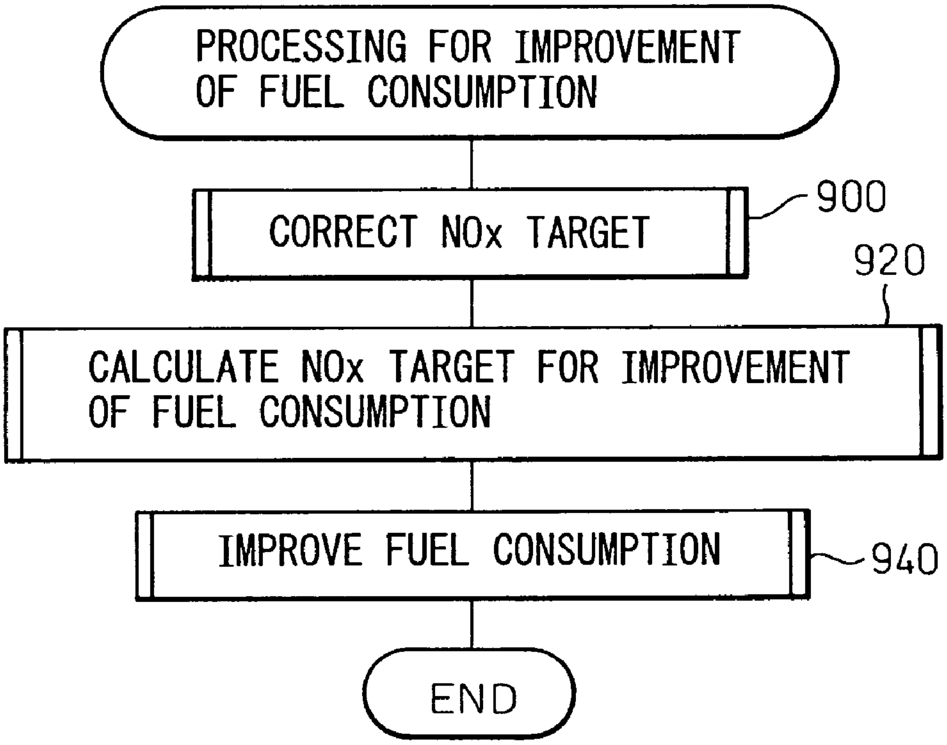
FIG. 22 is a flow chart of processing for improvement of the fuel efficiency.
Figure 23A:
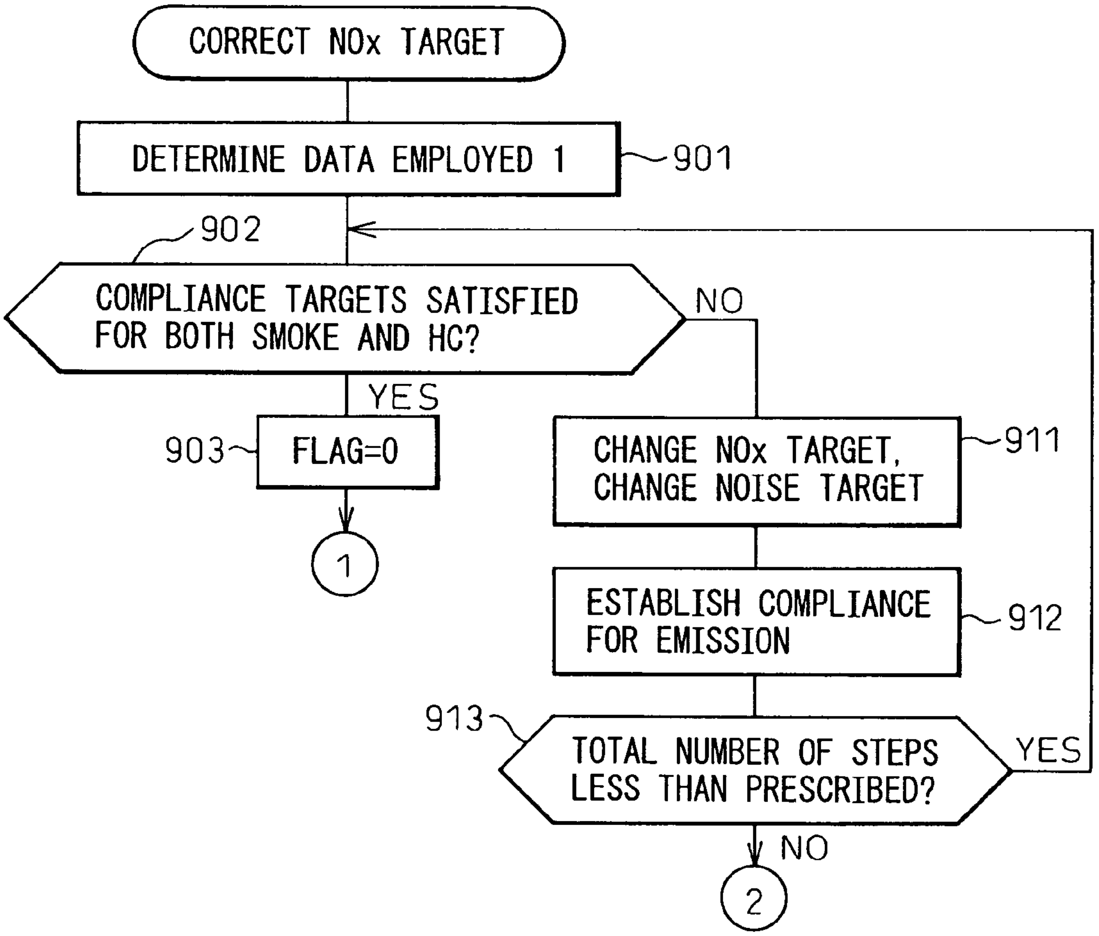
FIGS. 23A and 23B are a flow chart of correction of an NOx target.
Figure 23B:
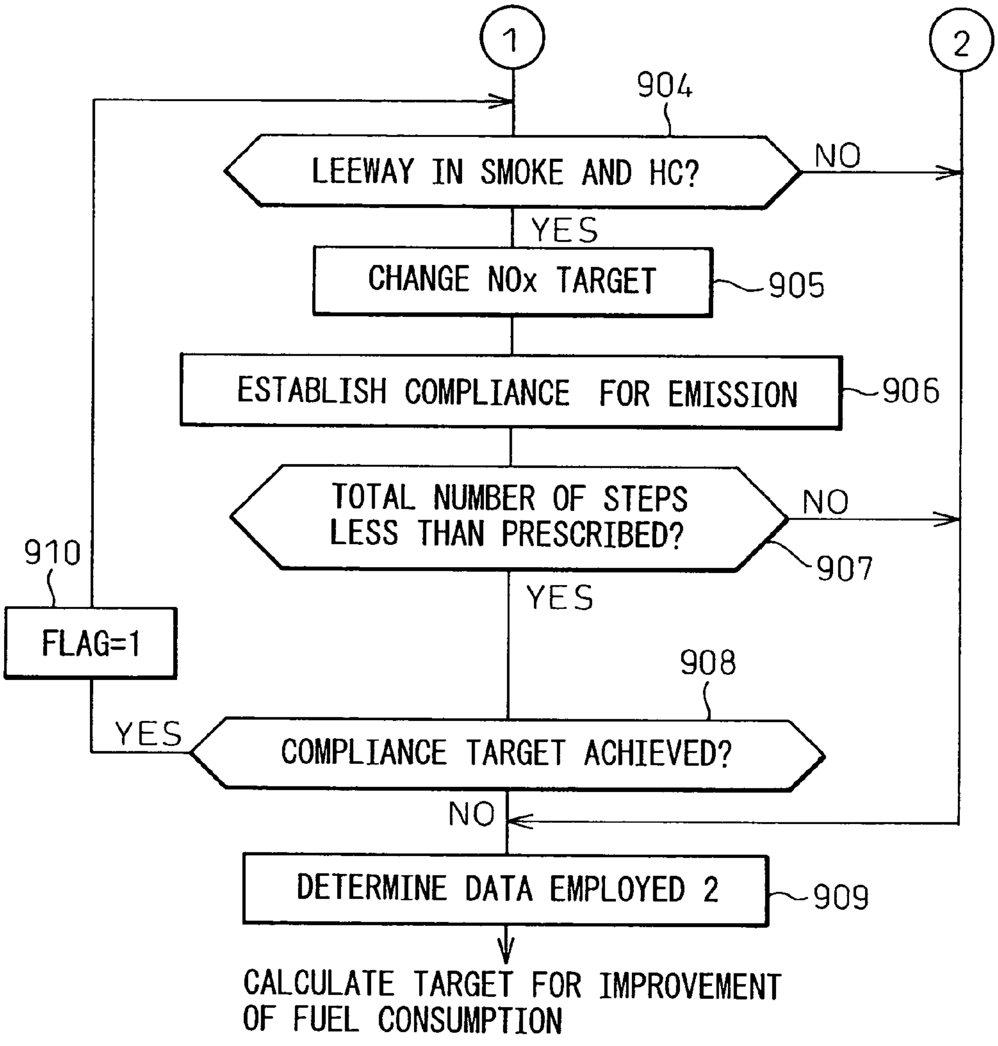
Figure 24:
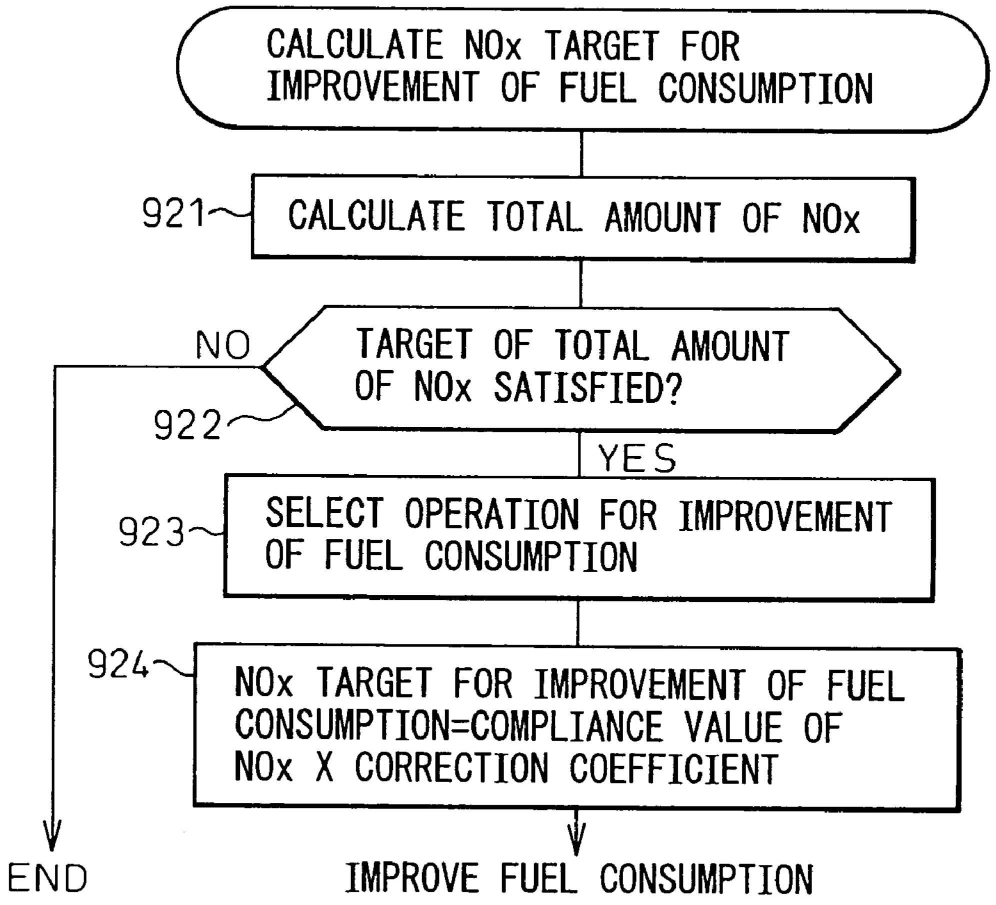
FIG. 24 is a flow chart of calculation of an NOx target for improvement of fuel efficiency.
Figure 26A:
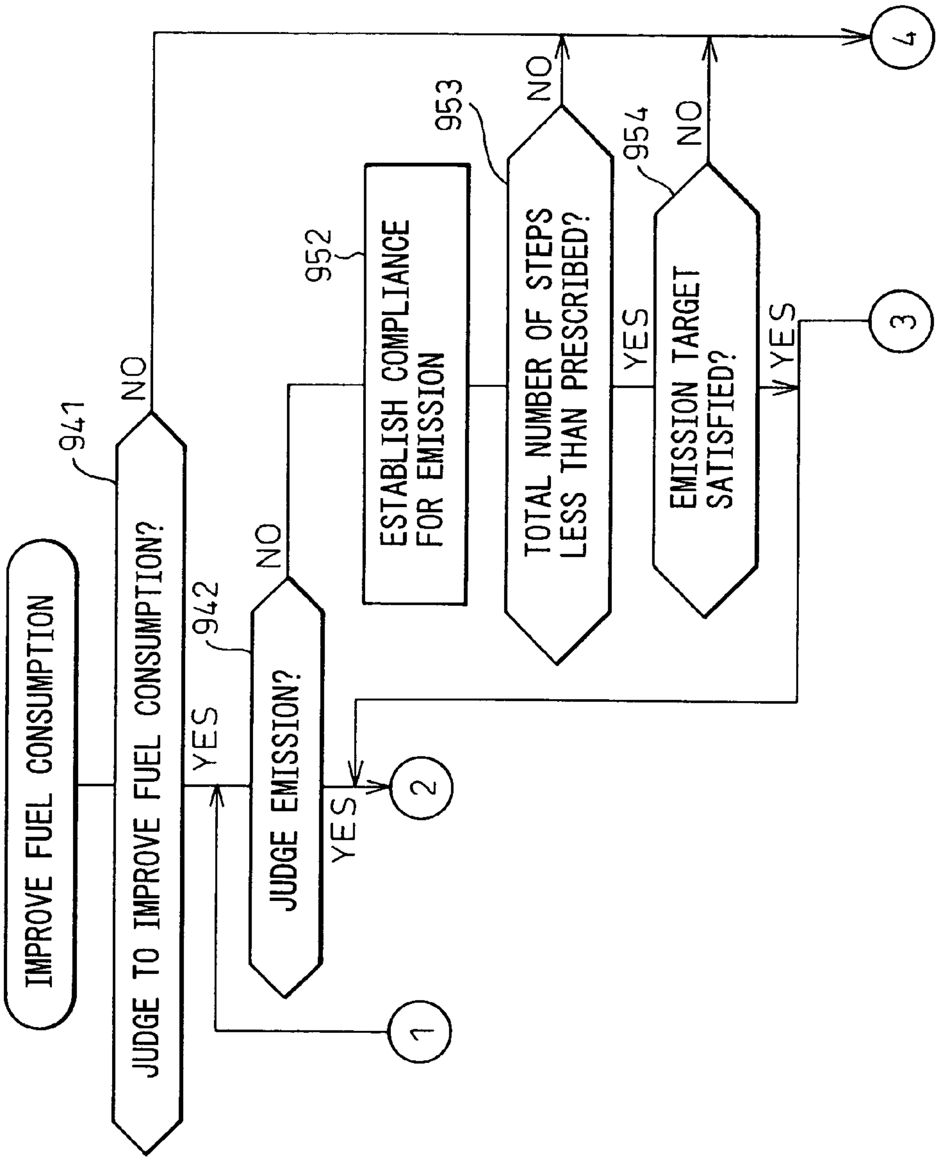
FIGS. 26A and 26B is a flow chart of improvement of fuel efficiency.
Figure 26B:
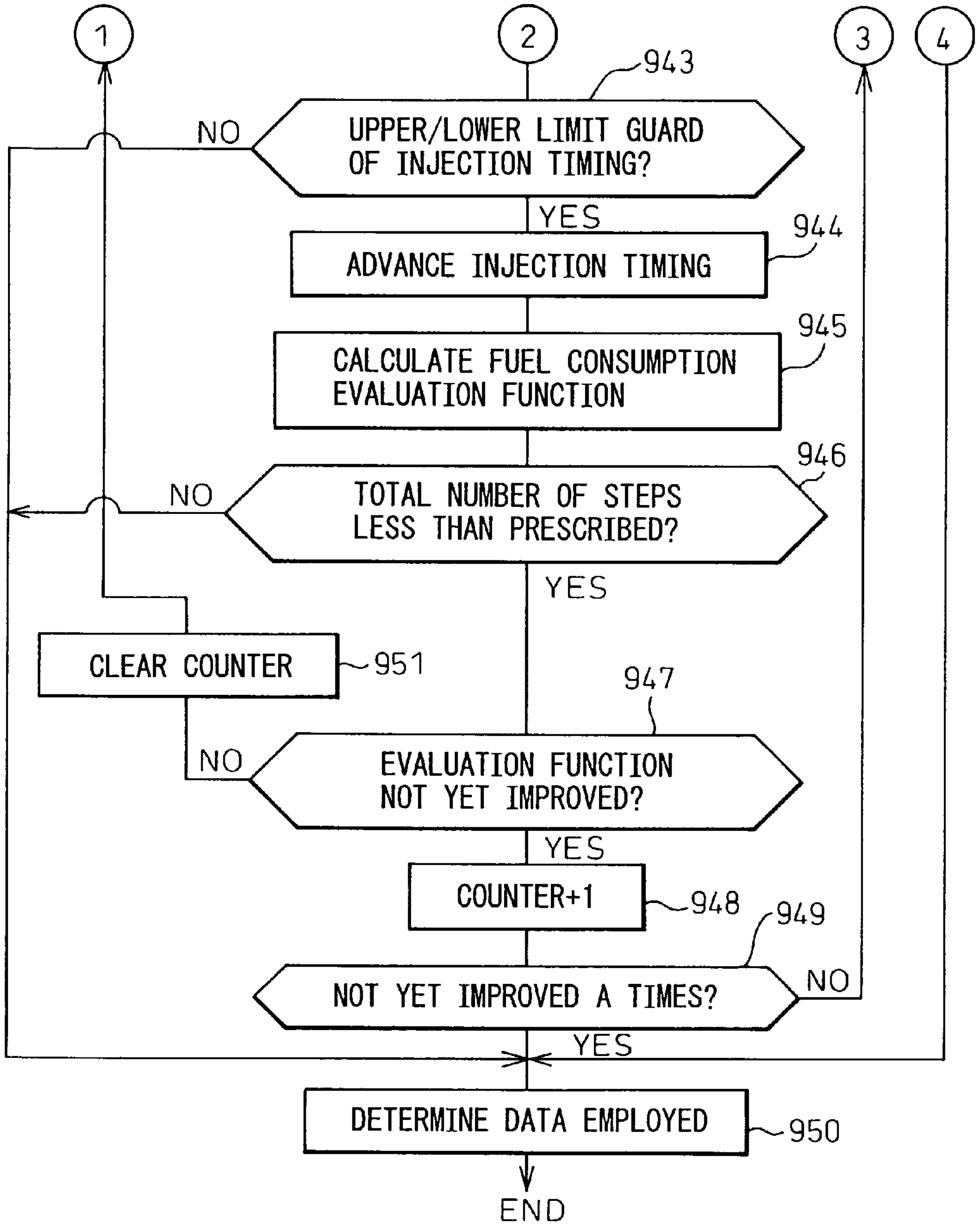

Referring to FIG. 22, first, at step 900, the compliance target value for each operating state is corrected. This routine for correction of the NOx target is shown in FIGS. 23A and 23B. Next, at step 920, the compliance target value for NOx in each operating state is calculated for improvement of the fuel consumption. This routine for calculation of the NOx target for improvement of the fuel consumption is shown in FIG. 24. Next, at step 940, this processing for improvement of the fuel consumption is executed. This routine for improvement of the fuel consumption is shown in FIGS. 26A and 26B.

Referring to FIGS. 23A and 23B showing the routine for correction of the NOx target, first, at step 901, the combination of parameters satisfying the following conditions is selected from the history data at the time of automatic compliance. In this case, first, it is judged if there is a combination of parameters satisfying the following priority order 1. If there is a combination of parameters satisfying the priority order 1, this combination of parameters is determined as the combination of parameters to be employed. As opposed to this, if there is no combination of parameters satisfying the priority order 1, the combination of parameters of the following priority order 2 is determined as the combination of parameters to be employed.

Priority order 1: Combination of parameters where all evaluation points of the evaluation points of NOx (=amount of exhaust NOx/compliance target), evaluation points of the concentration of smoke (=concentration of smoke/compliance target), evaluation points of hydrocarbons (=amount of exhaust hydrocarbons/compliance target), and evaluation points of combustion noise (=combustion noise/compliance target) are not more than 1.05 and the total of the evaluation points, that is, the evaluation function, becomes the minimum.

Priority order 2: Combination of parameters where the total of evaluation points, that is, the evaluation function, becomes the minimum.

If the combination of parameters to be employed is determined at step 901, the routine proceeds to step 902, where it is judged if the concentration of smoke and the amount of exhaust hydrocarbons both satisfy the compliance target values. In this case, when the evaluation points of the concentration of smoke and the evaluation points of the amount of exhaust hydrocarbons both are not more than 1.05, it is judged that the concentration of smoke and the amount of exhaust hydrocarbons satisfy the compliance target values. When it is judged at step 902 that the concentration of smoke and the amount of exhaust hydrocarbons both satisfy the compliance target values, the routine proceeds to step 903, where the flag is reset. Next, the routine proceeds to step 904.

At step 904, it is judged if there is leeway in both of the concentration of smoke and the amount of exhaust hydrocarbons with respect to the compliance target values. In this case, it is judged that there is leeway in the concentration of smoke and the amount of exhaust hydrocarbons if the evaluation points of the concentration of smoke and the evaluation points of the amount of exhaust hydrocarbons are both not more than 0.9 when the flag is reset and if the evaluation points of the concentration of smoke and the evaluation points of the amount of exhaust hydrocarbons are both not more than 1.0 when the flag is set.

Since the flag is reset when the routine first proceeds to step 904, it is judged if there is leeway in the concentration of smoke and the amount of exhaust hydrocarbons by whether the evaluation points of the concentration of smoke and the evaluation points of the amount of exhaust hydrocarbons are both not more than 0.9. When the evaluation points of the concentration of smoke and the evaluation points of the amount of exhaust hydrocarbons are not both not more than 0.9, it is judged that there is no leeway in the concentration of smoke and the amount of exhaust hydrocarbons and the routine proceeds to step 909. At step 909, the final combination of parameters to be employed is determined. The method of determining the final combination will be explained later.

On the other hand, when it is judged at step 904 that the evaluation points of the concentration of smoke and the evaluation points of the amount of exhaust hydrocarbons are both not more than 0.9, that is, when there is leeway in both the concentration of smoke and the amount of exhaust hydrocarbons, the routine proceeds to step 905, where the compliance target value of the NOx is made smaller. Next, at step 906, a combination of parameters where the amount of exhaust NOx, the concentration of smoke, the amount of exhaust hydrocarbons, and the combustion noise will meet or better the corresponding target values is searched for by a method similar to the routine for establishment of compliance of parameters shown in FIG. 9 and FIG. 10.

Next, at step 907, it is judged if the total of the number of adjustments of the parameters is less than the prescribed number. If the total of the number of adjustments of the parameters is the prescribed number or more, the routine proceeds to step 908, where it is judged if establishment of compliance is completed. When it is judged at step 907 that the total of the number of adjustments of the parameters exceeds the prescribed number or it is judged at step 908 that establishment of compliance is not possible, the routine proceeds to step 909.

As opposed to this, when it is judged at step 908 that establishment of compliance has been completed, the routine proceeds to step 910, where a flag is set, then the routine returns to step 904. At this time, it is judged if there is leeway in the concentration of smoke and amount of exhaust hydrocarbons by whether the evaluation points of the concentration of smoke and the evaluation points of the amount of exhaust hydrocarbons are both not more than 1.0. When it is judged that the evaluation points of the concentration of smoke and the evaluation points of the amount of exhaust hydrocarbons are both not more than 1.0, that is, when there is leeway in both of the concentration of smoke and the amount of exhaust hydrocarbons, the routine proceeds to step 905, where the compliance target value of the NOx is made further smaller. Next, at step 906, the combination of parameters whereby the amount of exhaust NOx, the concentration of smoke, the amount of exhaust hydrocarbons, and the combustion noise all meet or less than the corresponding compliance target values is searched for.

In this way, when there is leeway in the concentration of smoke and the amount of exhaust hydrocarbons, the compliance target value of the NOx is made smaller.

On the other hand, when it is judged at step 902 that the concentration of smoke or the amount of exhaust hydrocarbons does not satisfy the compliance target value, the routine proceeds to step 911, where the compliance target value of the NOx and the compliance target value of the combustion noise are made larger. Next, at step 912, the combination of parameters whereby the amount of exhaust NOx, the concentration of smoke, the amount of exhaust hydrocarbons, and the combustion noise meet or less than the corresponding compliance target values is searched for by a method similar to the routine for establishment of compliance of parameters shown in FIG. 9 and FIG. 10.

Next, at step 913, it is judged if the total of the number of adjustments of the parameters is less than a prescribed number. If the total of the number of adjustments of the parameters is less than the prescribed number, the routine returns to step 902, where the work for correction of the compliance target value of the NOx is continued, while when it is judged that the total of the number of adjustments of the parameters exceeds the prescribed number, the routine proceeds to step 909.

At step 909, the final combination of the parameters is determined. At this time, first, it is judged if there is a combination of parameters satisfying the following priority order 1. If there is a combination of parameters satisfying the priority order 1, the combination of the parameters is determined as the combination of parameters to be finally employed. As opposed to this, when there is no combination of parameters satisfying the priority order 1, the combination of parameters of the following priority order 2 is determined as the combination of parameters to be finally employed.

Priority order 1: Combination of parameters where all of the concentration of smoke, amount of exhaust hydrocarbons, and combustion noise satisfy the corresponding compliance target values and where the evaluation points of the amount of exhaust NOx become the minimum.

Priority order 2: Combination of parameters where both of the concentration of smoke and the amount of exhaust hydrocarbons satisfy the corresponding compliance target values and where the evaluation points of the amount of exhaust NOx becomes the minimum.

If the final combination of parameters is determined at step 909, the routine proceeds to the routine for calculation of the NOx target for improvement of the fuel consumption shown in FIG. 24. Note that the routine for correction of the NOx target shown in FIGS. 23A and 23B is executed after compliance finishes, for all compliant operating states, but the routine for correction of the NOx target may also be executed each time compliance is established in each compliant operating state.

As shown in FIG. 24, in this routine, first, the amount of exhaust NOx when the final combination of parameters is determined in the routine shown in FIGS. 23A and 23B, that is, the result of compliance of the amount of NOx, is used. The cumulative value of the amount of exhaust NOx when assuming running in a test mode using this result of compliance of the amount of NOx is calculated. Next, at step 922, it is judged if the cumulative value of the amount of exhaust NOx satisfies the overall target of the NOx. If the cumulative value of the amount of exhaust NOx exceeds the overall target of the NOx, the processing for improvement of the fuel consumption is ended and, at this time, the fuel consumption is not improved. As opposed to this, if the cumulative value of the amount of exhaust NOx satisfies the overall target value of NOx, the routine proceeds to step 923.

Figure 25:
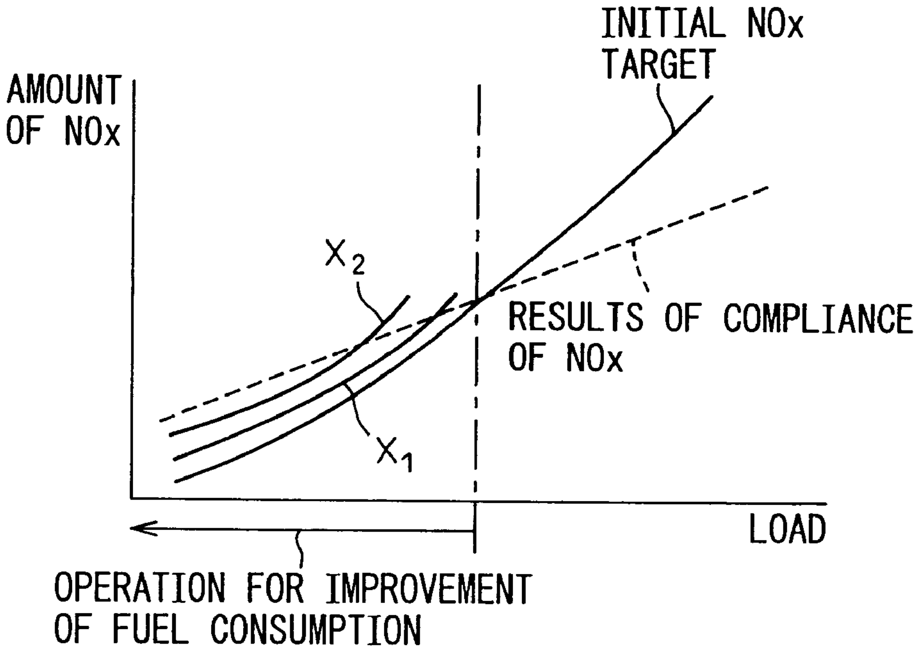
FIG. 25 is a view for explaining an NOx target for improvement of fuel efficiency.

At step 923, as shown in FIG. 25, the initial compliance target of the amount of NOx before correcting the compliance target of the amount of NOx, that is, the initial NOx target, and the result of compliance of the amount of NOx are compared. The operating region where the result of compliance of the amount of NOx satisfies the initial NOx target is made the operating region for improvement of the fuel consumption where the fuel consumption should be improved.

Next, at step 924, the compliance target of the NOx for improvement of the fuel consumption, that is, the NOx target for improvement of the fuel consumption, is calculated based on the following equation:

NO*x* target for improvement of fuel consumption=NO*x* compliance value·correction coefficient That is, first, the results of compliance of NOx in the operating region for improvement of the fuel consumption, that is, the NOx compliance value, is multiplied by a correction coefficient larger than 1.0 so as to calculate the NOx for improvement of the fuel consumption. The NOx target for improvement of the fuel consumption at this time is shown by the curve $X_1$ at FIG. 25. Next, the cumulative value of the amount of NOx is calculated when assuming running in a test mode using this NOx target $X_1$ for improvement of the fuel consumption. If the cumulative value of the amount of NOx satisfies the overall target value of NOx, the value of the correction coefficient is further increased. The NOx target for improvement of the fuel consumption is shown by the curve $X_2$ in FIG. 25. In this way, the maximum correction coefficient is found in the range where the cumulative value of the amount of NOx satisfies the overall target value of NOx, and this maximum correction coefficient is used to find the final NOx target for improvement of the fuel consumption. When the final NOx target for improvement of the fuel consumption is found, the routine proceeds to improvement of the fuel consumption shown in FIGS. 26A and 26B.

Referring to FIGS. 26A and 26B, in this routine, first, at step 941, it is judged if the fuel consumption should be improved. It is judged that the fuel consumption should be improved if the amount of exhaust NOx, the concentration of smoke, the amount of exhaust hydrocarbons, and the combustion noise satisfy the corresponding compliance target values and the amount of exhaust NOx satisfies the compliance target value with an extra margin. Note that the compliance target value of the NOx spoken of here is an NOx target for improvement of the fuel consumption. The larger the value of the correction coefficient, the greater the leeway in the amount of exhaust NOx. If the fuel consumption should not be improved, the routine jumps to step 950, while if the fuel consumption should be improved, the routine proceeds to step 942.

At step 942, it is judged if the amount of exhaust NOx, the concentration of smoke, the amount of exhaust hydrocarbons, and the combustion noise satisfy the corresponding compliance target values. If the amount of exhaust NOx, the concentration of smoke, the amount of exhaust hydrocarbons, and the combustion noise satisfy the corresponding compliance target values, the routine proceeds to step 943, where an operation for advancing the fuel injection timing for improving the fuel consumption is performed. That is, at step 943, it is judged if the injection timing to be advanced exceeds a predetermined upper limit or lower limit. If the injection timing to be advanced exceeds the upper limit or lower limit, the routine jumps to step 950, while if the injection timing to be advanced does not exceed the upper limit or lower limit, the routine proceeds to step 944, where the injection timing is advanced.

Next, at step 945, the evaluation function with respect to the fuel consumption (=current fuel consumption/initial fuel consumption) is calculated. Next, at step 946, it is judged if the total of the number of adjustments of parameters is less than the prescribed number. If the total of the number of adjustments of the parameters exceeds the prescribed number, the routine proceeds to step 950. If the total of the number of adjustments of the parameters does not exceed the prescribed number, the routine proceeds to step 947, where it is judged if the fuel consumption has been improved based on the evaluation function. In this embodiment, it is judged that the fuel consumption has been improved when the value of the evaluation function drops by at least a predetermined value from the minimum value of the evaluation function up to then. The value of the evaluation function at that time is then made the minimum value.

When it is judged at step 947 that the fuel consumption has been improved, the routine proceeds to step 951, where the counter is cleared, then the routine returns to step 942. If it is judged at step 942 that the amount of exhaust NOx, the concentration of smoke, the amount of exhaust hydrocarbons, and the combustion noise satisfy the corresponding compliance target values, the routine proceeds to step 944 through step 943, where the fuel injection timing is further advanced.

In this way, in this embodiment, it is judged if the output values satisfy the compliance target values each time processing for improvement of the fuel consumption, that is, the action for advancing the injection timing, is performed. The processing for improvement of the fuel consumption is executed so long as the output values satisfy the compliance target values.

On the other hand, when it is judged at step 947 that the fuel consumption is not improved, the routine proceeds to step 948, where the count of the counter is incremented by exactly 1, then at step 949, it is judged whether the state of improvement of the fuel consumption continued for at least A number of times. If the state of improvement of the fuel consumption did not continue for at least A number of times, the routine returns to step 943, where the injection timing is further advanced. As opposed to this, if the state of improvement of the fuel consumption continues for at least A number of times, the processing for improvement of the fuel consumption is stopped and the routine proceeds to step 950.

That is, in this embodiment, it is judged whether the fuel consumption has been improved each time processing for improvement of the fuel consumption is performed. If it is judged a predetermined number of times or more that the fuel consumption is not improved much at all, the processing for improvement of the fuel consumption is stopped.

On the other hand, at step 942, when any one of the amount of exhaust NOx, the concentration of smoke, the amount of hydrocarbons, and the combustion noise does not satisfy the corresponding compliance target value, the routine proceeds to step 952, where a method similar to the routine for establishing compliance for the parameters shown in FIG. 9 and FIG. 10 is used so as to find a combination of parameters whereby the amount of exhaust NOx, concentration of smoke, amount of hydrocarbons, and combustion noise equal or better the corresponding compliance target values.

Next, at step 953, it is judged if the total of the number of adjustments of the parameters is not more than the prescribed number. If the total of the number of adjustments of the parameters exceeds the prescribed number, the routine proceeds to step 950, while if the total of the number of adjustments of the parameters does not exceed the prescribed number, the routine proceeds to step 954, where it is judged if the amount of exhaust NOx, the concentration of smoke, the amount of exhaust hydrocarbons, and the combustion noise satisfy the corresponding compliance target values. If any of the amount of exhaust NOx, the concentration of smoke, the amount of exhaust hydrocarbons, and the combustion noise does not satisfy the corresponding compliance target value, the routine proceeds to step 950. As opposed to this, when the amount of exhaust NOx, the concentration of smoke, the amount of exhaust hydrocarbons, and the combustion noise satisfy the corresponding compliance target values, the routine proceeds to step 944 through step 943 and the injection timing is advanced.

At step 950, the combination of parameters by which the amount of exhaust NOx, the concentration of smoke, the amount of exhaust hydrocarbons, and the combustion noise satisfy the compliance target values and which gives the smallest fuel consumption is determined. That is, automatic compliance of the parameters is established so that the best fuel consumption is obtained.

According to the present invention, it is possible to reliably establish compliance.

While the invention has been described with reference to specific embodiments chosen for purpose of illustration, it should be apparent that numerous modifications could be made thereto by those skilled in the art without departing from the basic concept and scope of the invention.

What is claimed is:

1. An automatic compliance device comprising:

a compliant operating state determining device for determining a plurality of operating states for establishing compliance, each operating state being determined based on at least two parameters for which compliance is to be established;

a parameter initial value determining device for determining initial values of a plurality of parameters for control of the engine operation for each operating state for establishment of compliance;

a compliance target value determining device for determining compliance target values for the plurality of output values; and a parameter complying device for determining adjustment sequences and adjustment directions of a plurality of parameters for reducing output values exceeding compliance target values and sequentially adjusting these parameters in accordance with the determined adjustment sequences in the determined adjustment directions.

2. An automatic compliance device as set forth in claim 1, wherein vehicle specifications, engine specifications, and other information required for establishment of compliance are input when determining the operating states for establishing compliance.

3. An automatic compliance device as set forth in claim 1, wherein values of parameters suitable for the remaining operations are found based on complying parameters for at least one of a steady operation or transient operation in an engine or a steady operation or transient operation in a vehicle.

4. An automatic compliance device as set forth in claim 1, wherein the operating states for establishing compliance are set as points on a map as functions of the torque and engine speed and wherein said compliant operating state determining device determines the intervals of the points on the map and the ranges of the torque and engine speed for establishing compliance.

5. An automatic compliance device as set forth in claim 1, wherein where the operating states for establishing compliance are set as points on a map as functions of the torque and engine speed and where said compliant operating state determining device determines the ranges of the torque and engine speed for establishing compliance based on the torque and engine speed used in a test mode for evaluation of emission.

6. An automatic compliance device as set forth in claim 1, wherein said parameters for establishment of compliance are all or part of a main injection timing, pilot injection timing, amount of pilot injection, common rail pressure, opening degree of exhaust gas recirculation control valve, opening degree of intake throttle valve, and opening degree of variable nozzle of turbocharger.

7. An automatic compliance device as set forth in claim 6, wherein mean values of compliance of parameters of existing engines having specifications corresponding to the specifications of the engine for establishment of compliance are stored in advance and wherein the parameter initial value determining device uses the mean values of compliance as initial values of the parameters.

8. An automatic compliance device as set forth in claim 1, wherein the output values are all or part of the emission, combustion noise, and fuel consumption and the emission is all or part of an amount of NOx in exhaust gas, concentration of smoke or amount of particulate, amount of hydrocarbons, and amount of CO.

9. An automatic compliance device as set forth in claim 8, wherein compliance targets of the amount of NOx, amount of particulate, amount of hydrocarbons, and amount of CO in the output values are overall targets which is equal to cumulative values when running in a test mode for evaluation of emission and where the compliance targets of the remaining output values are target values in each operating state for establishment of compliance.

10. An automatic compliance device as set forth in claim 9, wherein compliance targets of output targets in each operation state are determined for output values having overall targets so that the cumulative values of the output values when running in the test mode become less than predetermined development targets.

11. An automatic compliance device as set forth in claim 10, wherein the ratios of output values per unit time and unit engine output in each operating state with respect to mean output values per unit time and unit engine output when running in a test mode at existing engines having specifications corresponding to the specifications of the engine for establishment of compliance are stored for each operating state, the mean target values per unit time and unit engine output when the cumulative values of the output values when running in the test mode become development target values are calculated, and the compliance target values of the output values in each operating state are calculated from the mean target values and corresponding ratios.

12. An automatic compliance device as set forth in claim 11, wherein the cumulative values of the output values when running under the test mode are calculated under the assumption that the output values of each operating state become the calculated compliance target values and the compliance target values of the output values in each operating state are corrected so that the cumulative values become not more than the development target values when the cumulative values exceed the development target values.

13. An automatic compliance device as set forth in claim 1, wherein said parameter complying device sequentially adjusts the engine in each operating state using initial values of parameters determined by the parameter initial value determining device and wherein the adjustment sequences and adjustment directions of a plurality of parameters for reduction of the exceeding output values are determined when there are output values exceeding the compliance target values at that time.

14. An automatic compliance device as set forth in claim 13, wherein the compliance values of existing engines having specifications corresponding to specifications of an engine for establishment of compliance are stored in advance and wherein the ranges of search of the parameters for compliance are made the ranges of standard deviation about mean values of compliance of existing engines.

15. An automatic compliance device as set forth in claim 14, wherein the ranges of search of parameters are corrected in accordance with the extents by which the output values exceed the compliance target values when operating in each operating state using the initial values of the parameters and the ranges of search of the parameters are made narrower the smaller the extent of excess.

16. An automatic compliance device as set forth in claim 13, wherein the relationships between the output values and the adjustment sequences and adjustment directions of the parameters to be adjusted when the output values exceed the compliance target values are stored in advance and wherein the adjustment sequences and adjustment directions of the parameters are determined based on these relationships when output values exceed the compliance target values.

17. An automatic compliance device as set forth in claim 13, wherein the relationships between the plurality of output values and the adjustment sequences and adjustment directions of the parameters to be adjusted when the plurality of output values exceed the compliance target values are stored in advance and wherein the adjustment sequences and adjustment directions are determined based on the relationships in accordance with the deterioration of these output values.

18. An automatic compliance device as set forth in claim 13, wherein the relationships between the output values and the adjustment sequences and adjustment directions of the parameters to be adjusted when the output values exceed the compliance target values are stored in advance, it is judged that output values are in a tradeoff for a common parameter to be adjusted when a plurality of output values exceed the compliance target values, and the parameters to be adjusted and the adjustment sequences and adjustment directions of the parameters are determined based on that judgment.

19. An automatic compliance device as set forth in claim 18, wherein when a plurality of output values exceed the compliance target values, the output values of the top two extents of deterioration are extracted from these output values and it is judged whether or not these two output values are in a tradeoff.

20. An automatic compliance device as set forth in claim 18, wherein when output values are in a tradeoff with respect to a common parameter, the parameter is not adjusted and the other parameters differing in adjustment sequence are adjusted in order from the parameter with the earlier adjustment sequence and other parameters with the same adjustment sequence are adjusted in order from the parameters for output values with high degrees of deterioration.

21. An automatic compliance device as set forth in claim 18, wherein when output values are not in a tradeoff with respect to a common parameter, parameters differing in adjustment sequence are operated in order from the parameters with the earlier adjustment sequence and parameters with the same adjustment sequence are operated in order from the parameters for output values with high degrees of deterioration.

22. An automatic compliance device as set forth in claim 1, wherein an evaluating device is provided for evaluating change in output values when a parameter is operated and wherein said parameter complying device performs a compliance operation of a parameter in accordance with the evaluation by the evaluating device.

23. An automatic compliance device as set forth in claim 22, wherein said evaluating device evaluates changes of output values using an evaluation function expressing a ratio of the output values with respect to the compliance target values.

24. An automatic compliance device as set forth in claim 22, wherein said parameter complying device continues to adjust the same parameter when it is evaluated that the output values when adjusting parameters are declining in trend.

25. An automatic compliance device as set forth in claim 24, wherein said evaluating device evaluates changes in output values using an evaluation function showing the ratio of output values with respect to compliance target values and wherein said parameter complying device continues to adjust the same parameter when the amount of reduction of the evaluation function is more than a predetermined prescribed value when a parameter is adjusted.

26. An automatic compliance device as set forth in claim 13, wherein said parameter complying device changes the parameter to be adjusted to the next parameter in accordance with an adjustment sequence of the parameters when it is evaluated that the output values have not changed much at all or when the output values rise in trend when a parameter is adjusted.

27. An automatic compliance device as set forth in claim 26, wherein said evaluating device evaluates changes in output values using an evaluation function showing the ratio of output values with respect to compliance target values and wherein said parameter complying device changes the parameter to be adjusted to the next parameter in accordance with an adjustment sequence of the parameters when the amount of reduction of the evaluation function is at least a predetermined prescribed value when a parameter is adjusted or when the value of the evaluation function rises.

28. An automatic compliance device as set forth in claim 13, wherein when a number of adjustments of parameters or a time required for establishment of compliance exceeds a predetermined setting in a compliance operation for one operating state, priority is given to a compliance operation of output values not having overall target values.

29. An automatic compliance device as set forth in claim 13, wherein evaluating device evaluates changes in output values using an evaluation function showing the ratio of output values to compliance target values, learns the amount of reduction of the evaluation function when adjusting a parameter, and changes the adjustment sequence of the parameters to an order of the magnitude of the amount of reduction of the evaluation function.

30. An automatic compliance device as set forth in claim 13, wherein when it is judged that the compliance operation has been completed for one operating state, the device shifts to the compliance operation for the next operating state.

31. An automatic compliance device as set forth in claim 1, wherein when the compliance operations for all operating states have been completed, cumulative values of output values when running in a test mode are calculated for output values having overall target values and wherein a recomplying device is provided for performing a recompliance operation when the cumulative values calculated exceed development target values or when there is leeway with respect to development target values.

32. An automatic compliance device as set forth in claim 31, wherein said recomplying device extracts operating states satisfying all compliance target values from the operating states for establishment of compliance and lowers the compliance target values of the output values not satisfying the overall target values among the overall target values in the operating states satisfying all compliance target values.

33. An automatic compliance device as set forth in claim 32, wherein the extents of drop of said compliance target values are determined for each operating state in accordance with a frequency of use at a test mode and the extents of drop of the compliance target values are made larger the higher the frequency of use in the test mode in an operating state.

34. An automatic compliance device as set forth in claim 31, wherein when the cumulative values of output values having overall target values are lower than the overall target values by at least a certain setting, the compliance target values in each operating state of the output values are increased, the operating states where the compliance target values are not satisfied are extracted for outputs other than those output values, and the compliance target values in those operating states are made lower.

35. An automatic compliance device as set forth in claim 1, wherein the output values are all or part of the emission, combustion noise, and fuel consumption, the emission is all or part of the amount of NOx in the exhaust gas, the concentration of smoke or amount of particulate, amount of hydrocarbons, and amount of CO, the compliance target value of the amount of NOx is an overall target value which is equal to a cumulative value when running in a test mode for evaluation of the emission, the cumulative value of the amount of NOx when running in the test mode is calculated, and processing is performed for improvement of the fuel consumption when there is leeway in the cumulative value of the amount of NOx calculated with respect to the overall target value.

36. An automatic compliance device as set forth in claim 35, wherein a compliance target value for NOx is set for each operating state for improvement of fuel consumption and the processing for improvement of the fuel consumption is comprised of processing for increasing the compliance target value of NOx and advancing the fuel injection timing in each operating state for improvement of fuel consumption.

37. An automatic compliance device as set forth in claim 36, wherein it is judged whether each output value satisfies the compliance target value each time processing for improvement of the fuel consumption is performed and processing for improvement of fuel consumption is executed so long as each output value satisfies the compliance target value.

38. An automatic compliance device as set forth in claim 36, wherein it is judged whether the fuel consumption has been improved each time processing for improvement of fuel consumption is performed and when it is judged at least a predetermined number of times that the fuel consumption has not been improved much at all, the processing for improvement of fuel consumption is stopped.

39. An automatic compliance method comprising the steps of:

determining a plurality of operating states for establishing compliance, each operating states being determined based on at least two parameters for which compliance is to be established;

determining initial values of a plurality of parameters for control of engine operation for individual operating states for establishing compliance;

determining compliance target values for the plurality of output values;

determining adjustment sequences and adjustment directions of a plurality of parameters for reducing output values exceeding compliance target values; and sequentially adjusting these parameters in accordance with the determined adjustment sequences in the determined adjustment directions.

40. An automobile enabling onboard establishment of compliance provided with an automatic compliance device provided with compliant operating state determining device for determining a plurality of operating states for establishing compliance, each operating states being determined based on at least two parameters for which compliance is to be established, parameter initial value determining device for determining initial values of a plurality of parameters for control of the engine operation for each operating state for establishment of compliance, compliance target value determining device for determining compliance target values for the plurality of output values, and parameter complying device for determining adjustment sequences and adjustment directions of a plurality of parameters for reducing output values exceeding compliance target values and sequentially adjusting these parameters in accordance with the determined adjustment sequences in the determined adjustment directions.

41. An automobile as set forth in claim 40, wherein said automatic compliance device is provided with a vehicle model for outputting output values of a vehicle when receiving as input parameters and wherein said parameters are adjusted based on the output values of said vehicle model.

42. An automobile as set forth in claim 40, wherein actual output values of the vehicle are measured and wherein said vehicle model is corrected based on the measured output values.

43. An automobile as set forth in claim 40, wherein said vehicle model is stored in an exchangeable storage medium.

44. A computer program for realizing on automatic compliance device stored on a computer readable medium, the program comprising:

instructions for determining a plurality of operating states for establishing compliance each operating state being determined based on at least two parameters for which compliance is to be established;

instructions for determining initial values of a plurality of parameters for control of the engine operation for each operating state for establishment of compliance;

instructions for determining compliance target values for the plurality of output values; and instructions for determining adjustment sequences and adjustment directions of a plurality of parameters for reducing output values exceeding compliance target values and sequentially adjusting these parameters in accordance with the determined adjustment sequences in the determined adjustment directions.

* * * * *